(12) United States Patent
Wang

(10) Patent No.: US 9,928,735 B2
(45) Date of Patent: Mar. 27, 2018

(54) SYSTEMS AND METHODS FOR TRAFFIC VIOLATION AVOIDANCE

(71) Applicant: Kevin Sunlin Wang, Flushing, NY (US)

(72) Inventor: Kevin Sunlin Wang, Flushing, NY (US)

(73) Assignee: OPERR TECHNOLOGIES, INC., Flushing, NY (US)

( * ) Notice: Subject to any disclaimer, the term of this patent is extended or adjusted under 35 U.S.C. 154(b) by 0 days.

(21) Appl. No.: 15/019,862

(22) Filed: Feb. 9, 2016

(65) Prior Publication Data

US 2016/0232785 A1    Aug. 11, 2016

Related U.S. Application Data

(60) Provisional application No. 62/113,922, filed on Feb. 9, 2015, provisional application No. 62/150,118, filed on Apr. 20, 2015, provisional application No. 62/234,279, filed on Sep. 29, 2015.

(51) Int. Cl.
| | |
|---|---|
| G08G 1/01 | (2006.01) |
| G06Q 50/26 | (2012.01) |
| G08G 1/017 | (2006.01) |
| G08G 1/054 | (2006.01) |

(52) U.S. Cl.
CPC ......... *G08G 1/0137* (2013.01); *G06Q 50/265* (2013.01); *G08G 1/0116* (2013.01); *G08G 1/0129* (2013.01); *G08G 1/0175* (2013.01); *G08G 1/054* (2013.01)

(58) Field of Classification Search
CPC .. G08G 1/0137; G08G 1/0116; G08G 1/0129; G08G 1/0175; G08G 1/054; G06Q 50/265
USPC ......... 701/119, 117; 340/441, 903, 917, 929
See application file for complete search history.

(56) References Cited

U.S. PATENT DOCUMENTS

| | | | |
|---|---|---|---|
| 6,515,596 B2 * | 2/2003 | Awada | G08G 1/096716 340/901 |
| 8,229,658 B1 * | 7/2012 | Dabell | G08G 1/0129 701/117 |
| 8,294,594 B2 * | 10/2012 | Goudy | G08G 1/096783 340/905 |

(Continued)

*Primary Examiner* — Marthe Y Marc-Coleman
(74) *Attorney, Agent, or Firm* — Monte, Wang & Associates, PLLC

(57) ABSTRACT

The various embodiments herein provide a system for mapping and storing traffic violation citations and alerting a user of traffic violations. The system comprises a location identifier, an accelerometer, a unified database, a data processing module, a forum module, and a display apparatus. The unified database comprises traffic related data for commercial and non-commercial vehicles. The unified database is synchronized with the location identifier about commercial or non-commercial vehicle based on a type of vehicle and vehicle plate. The unified database contains historical and real-time traffic violation citations and other traffic related information resides in a central server. The data processing module is connected to the location identifier and the unified database through a communication medium. The data processing module is further connected to the accelerometer. The display apparatus is connected to the data processing module.

60 Claims, 14 Drawing Sheets

(56) References Cited

U.S. PATENT DOCUMENTS

| | | | | |
|---|---|---|---|---|
| 2002/0036572 A1* | 3/2002 | Yamaki | ............... | G08G 1/052 340/933 |
| 2006/0220905 A1* | 10/2006 | Hovestadt | ............ | G08G 1/052 340/901 |
| 2009/0224942 A1* | 9/2009 | Goudy | ............... | G08G 1/164 340/905 |
| 2010/0169007 A1* | 7/2010 | Kaushik | ............ | G08G 1/0962 701/532 |
| 2010/0271497 A1* | 10/2010 | Monsive, Jr. | ......... | G08G 1/04 348/211.99 |
| 2013/0093895 A1* | 4/2013 | Palmer | ................ | G08G 1/04 348/149 |
| 2013/0316311 A1* | 11/2013 | England | ............ | G09B 19/167 434/65 |

* cited by examiner

FORUM (700)

Comments on the geographic area you are in or entering (702)

USERID202- Avoid 34$^{th}$ St. bus lane violations (Bus only! 7 am – 10am, 4 pm-7pm, Mon-Fri) (704)

USERID204- 'No left turn' to the 8$^{th}$ Ave from 34$^{th}$ ST (8$^{th}$ Ave is one way road) (706)

USERID206- Accidents happened at this 34$^{th}$ ST and 8$^{th}$ Ave intersection before (708)

FIGURE 7

FIGURE 9 storing a plurality of the traffic related information including at least one of bus lane cameras, bus lane locations, speed cameras locations, school zone locations and traffic light cameras (900)

receiving a geocoded location through a location identifier (902)

inferring traffic ticket specific information (904)

searching and analyzing historical and real time traffic violation data, stored in a unified database of a computing system, based on a type of vehicle and a type of vehicle plate in a specific geocoded location, wherein the searching is performed in the unified database through a microprocessor stored in a server (906)

using an internal clock mechanism to identify current time and date (908)

FIGURE 12

```
receiving geolocation, date, time and violation codes, for each of the
issued traffic violation citations for both commercial and non-
commercial vehicles from the unified database (1200)
```

```
receiving traffic rules for both commercial and non-commercial
vehicles from the unified database (1202)
```

```
deciphering violation codes for both commercial and non-commercial
vehicles from the unified database and correlating the deciphered
violation codes to the traffic rules and regulations from the unified
database (1204)
```

```
clustering data based on reasons, the geocoded location, time, date, type
of vehicle, and type of vehicle plate for each of the issued traffic
violation citations (1206)
```

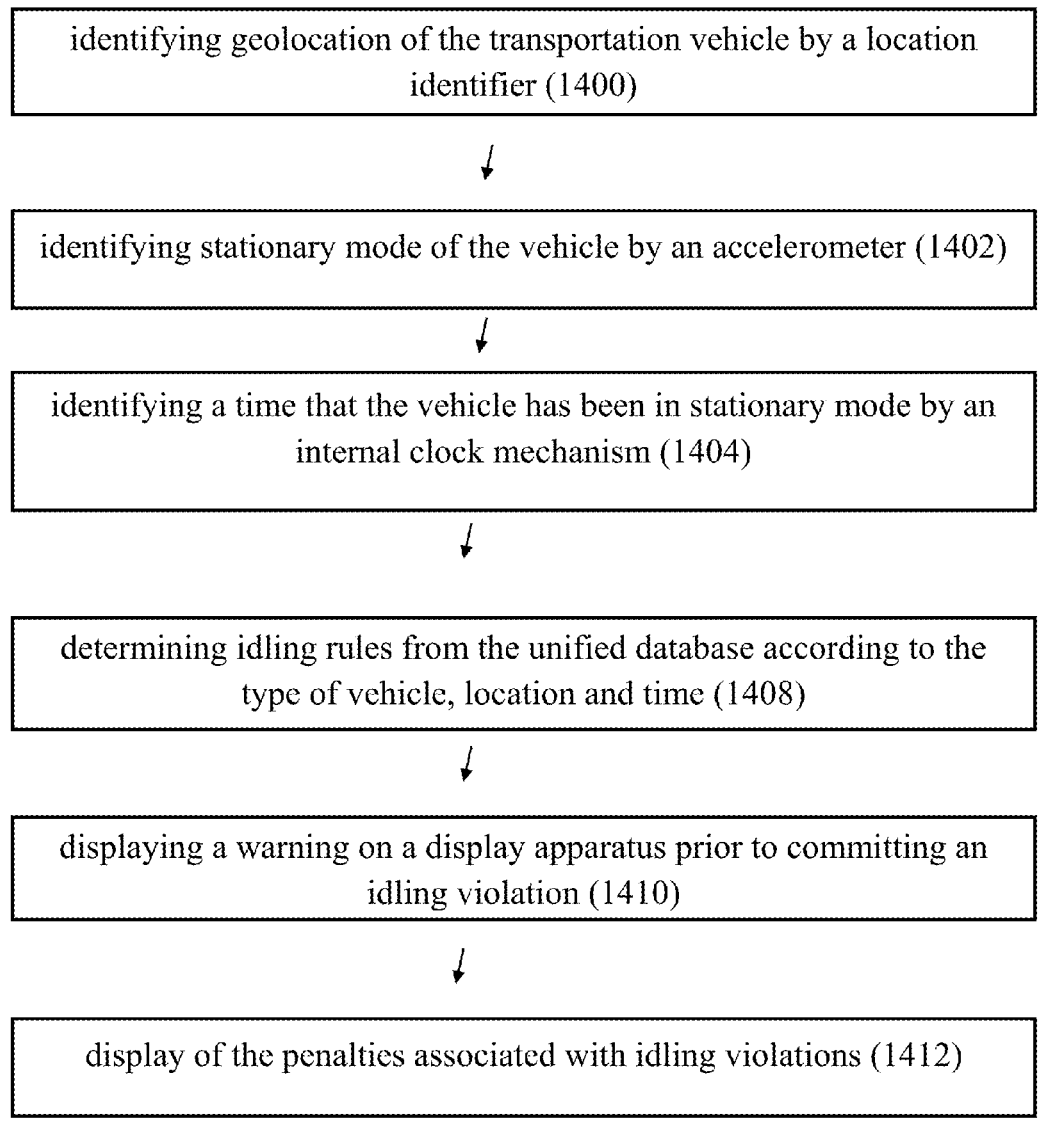

SYSTEMS AND METHODS FOR TRAFFIC VIOLATION AVOIDANCE

CROSS-REFERENCE TO RELATED APPLICATION

The present application is based on provisional application Ser. No. 62/113,922, filed on Feb. 9, 2015, provisional application Ser. No. 62/150,118, filed on Apr. 20, 2015, and provisional application Ser. No. 62/234,279, filed on Sep. 29, 2015, the entire contents of which are herein incorporated by reference.

BACKGROUND

Technical Field of Invention

The embodiments herein generally relate to avoidance of traffic violations, more particularly relate to a method and system for gathering and analyzing traffic violation related data to predict a potential traffic violation for a user and alert the user against the potential traffic violations.

Description of Related Art

In many jurisdictions throughout the world, the manner in which people operate vehicles on the public roadways is highly regulated. These regulations are in place primarily for the purpose of public safety and for ensuring an orderly flow of traffic. It is therefore important that traffic laws be followed.

Some traffic laws and regulations, such as stop signs are universal and therefore drivers might not experience much difficulty in knowing what to do when encountering a stop sign. The speed limits are the most common traffic laws and are in place to let drivers know how fast or how slow they should be driving. The other traffic laws and regulations, however, are mostly specific to a particular section of roadway during a particular time. For example, the left turns might not be permitted at an intersection during specific hours of the day. In such cases, a proper understanding of the actions which needs to be taken in order to avoid the violation of the traffic laws becomes highly important.

Moreover, violating a traffic law has significant consequences such as fines, increased vehicle insurance premiums, revocation of a driver's license, contributing to a traffic accident, and even jail time.

The traffic laws tend to be enforced either by police officers or monitoring apparatus such as red-light cameras, school zone speed cameras, etc. A motorist found to have violated a traffic law may be issued a citation. Such citations are referred to as a ticket. A ticket is ordinarily a fixed amount of money, sometimes being an amount of money determined based on the facts of each individual case. Accordingly, both the act of violating a traffic law and the citation issued for doing so, are referred to as a moving violation.

The tickets issued for traffic violations are difficult to contest successfully and carry a significant monetary penalty. Additionally, the traffic violations impede the normal flow of traffic and endanger the public safety. Accordingly, it is in the public interest to increase adherence to traffic rules.

However, the traffic rules are very complex, especially in large cities such as New York City. The New York City Traffic Rules and Regulations comprise Chapter 4 of Title 34 of the Rules of the City of New York, thereafter "NYC". It includes rules on traffic signals, pedestrians, bicyclists and motorists, drivers, restrictions on turns, speed restrictions, other restrictions on movement, rules for trucks, taxis and for-hire vehicles, truck routes, rules pertaining to parkways and parking location limitations upon dimensions and weight of vehicles, and other information. It is therefore common for the drivers to accidentally commit traffic violations even when they have no intention to violate the rules. The constant congestion paired with the continuing increase of vehicles on the road also exacerbates the current rate of traffic violations.

Although the traffic rules are mostly very transparent and understandable in nature, they are sometimes not very clear when applied in the real driving situations on the street. The drivers often receive the traffic violation tickets due to lack of understanding or confusion about the traffic rules and traffic signs at specific locations.

Furthermore, the traffic law specifies the prohibited actions in general but does not address every detail of the prohibited actions in a practical manner during the real traffic situations.

Currently, there is no effective mobile based application or web-based computer readable program, method and/or system for navigation in the vehicle for substantially reducing the rate of traffic rule violations.

In the view of foregoing, there is a need for a method and a system for storing and updating traffic violation citation data for a plurality of locations. Also there is a need for a system and method for avoidance of traffic violation citations by alerting a user of a potential traffic violation in a current location of the user on the basis of the analysis of the historic traffic violation citation data of the location. Further there is a need for an information resource for the users to educate the users about the prohibited laws as a practical matter in relation to the traffic rules, regulations, and citations by using a historical citation data and real time crowdsourced information obtained from the traffic tickets. Further there is a need for a system and method for assisting the users in understanding an application of the traffic rules, regulations, laws, citations, etc. (hereinafter, "RRLC") in the real street traffic situations for specific locations to avoid traffic violations.

The above mentioned shortcomings, disadvantages and problems are addressed herein, as detailed below.

SUMMARY OF THE INVENTION

The primary object of the embodiments herein is to provide a method and system for storing and updating traffic violation citation data for a plurality of users to avoid traffic violations.

Exemplary embodiments of the present invention provide systems and methods for avoidance of traffic violation citations by alerting a user of a potential traffic violation in a current location of the user or any location requested by the user on the basis of the analysis of the historic traffic violation citation data of the location.

Exemplary embodiments of the present invention provide an information resource for the users about the prohibited laws as a practical matter in relation to the traffic rules, regulations, and citations by using a historical and real time crowdsourced information available on the traffic tickets.

There is a need to supplement deficiencies in publically available government data because the government databases for traffic violations are sometimes incomplete due to the lack of data and/or other relevant information due to privacy protection measures and other reasons. There is a need for the users to have up-to-date traffic violation related information so that the users are informed on time. Thus, it is beneficial to provide improved techniques for obtaining and analyzing traffic data with sufficient details to provide current traffic road conditions and the reasons for the traffic violations, which will substantially reduce overall risks as well as the risks of receiving a traffic violation citation.

To establish a method to avoid traffic violations, various embodiments herein provide a system for mapping and storing information about a plurality of traffic violation citations and alerting a user of a potential traffic violation for commercial and non-commercial vehicles based on a type of vehicle and type of vehicle plate.

The plurality of historical traffic violation citations comprise geolocations, reasons, time and date of an issuance of traffic violation citations, red light cameras, speed camera locations, bus lane locations, bus lane cameras and applicable penalty information and other traffic violation related information.

Exemplary embodiments of the present invention cross-correlate an identified current location of the users with time and location of the issued traffic violation citations and the traffic rules to predict a likelihood of receiving a traffic violation citation at the user's identified or current location, time and date.

Exemplary embodiments of the present invention may utilize a general forum or a specific forum, wherein the specific forum is connected to a specific traffic violation related to a specific location and the general forum is not related to a specific location but provides information on traffic violations in general. The forum module shares ideas, raises questions, collects answers, raises concerns, provides and obtains information related to avoidance of the traffic violations.

Exemplary embodiments of the present invention incorporate a unified database wherein the unified database further comprises a traffic sign database, associated with the forum module, wherein the traffic sign database stores the traffic sign locations, images and applicable rules. The traffic sign database reports an existence of the temporary traffic notices applying to certain locations. The user may connect to the forum module to clarify the meanings of the traffic signs.

An alert is issued to the user in advance detailing the potential reasons of violations applicable to a same type of vehicle plate or a same type of vehicle during the user's approach to an intended location associated with one or more issued traffic violation citations and one or more traffic rules.

Exemplary embodiments of the present invention utilize the display apparatus associated with the mobile device to display a comparison of traffic rules for different countries, states, cities, or municipalities as different rules may apply to different type of vehicles and type of vehicle plates depending on their geographic location. The comparison is based on an identified current location of the user or any location requested by the user and a location obtained from the user's driver license stored in a user profile.

Exemplary embodiments of the present invention utilize a location identifier and the speed sensor to identify location and speed of the user and alert the user during driving in a predefined radius of locations with speed limitations. The locations with speed limitations are identified through different formats, such as shapes and colors.

The method reduces a possibility of getting traffic violation citation by helping users to avoid traffic zones with history of issued traffic violation citations or avoid violation within such zones. The zones with issued traffic violation citations are identified with different formats, such as shapes or colors based on the type of the vehicle and type of the vehicle plate. These formats for the traffic zones are displayed on the electronic map and location data through the display module.

Exemplary embodiments of the present invention provide traffic violation alerts by combining a traffic advisory with route planning. The method comprises the steps of entering a route planning mode through a GPS navigation system in a vehicle and/or a mobile device; retrieving a traffic violation citation data, traffic rules and regulations from the unified database and providing the advisory traffic alerts to the user along the route; suggesting a route to the user to an intended destination with least amount of issued traffic violation citations based on the preferences of the user.

Exemplary embodiments of the present invention identifies idling of the vehicle through identification of the geolocation of the user by a location identifier; identification of the stationary mode of the vehicle by an accelerometer either in the vehicle or in the mobile device; identification of time that the vehicle has been in stationary mode by an internal clock mechanism, wherein the internal clock mechanism starts tracking the time from beginning of the vehicle being in stationary mode; and a data processing module to identify location of the user, wherein the data processing module is connected to the location identifier through a communication medium; inferring of the idling rules from the unified database according to the type of the vehicle, location and time; and display of a warning to the user prior to committing an idling violation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 7 depicts a forum according to the present invention;

FIGS. 9-14 depicts aspects of methods according to the present invention.

DETAILED DESCRIPTION

Figure 1:
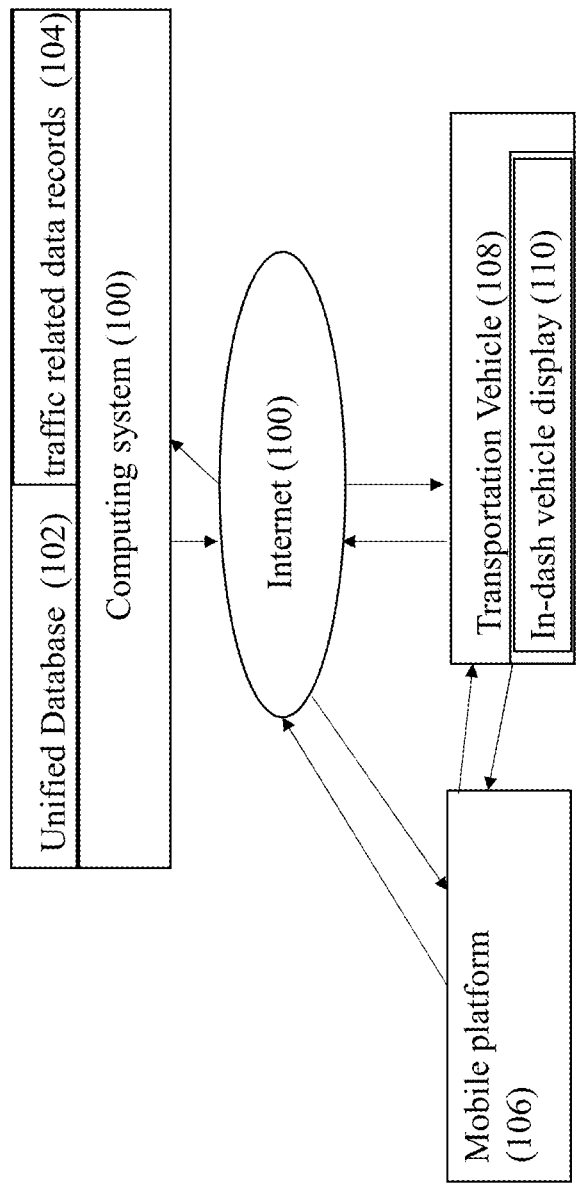
FIG. 1 depicts a system according to the present invention.
Figure 2:
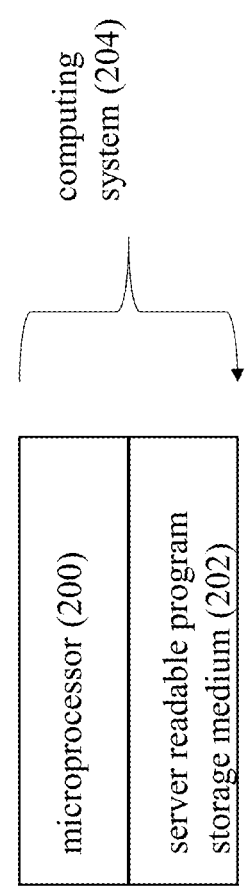
FIG. 2 depicts a portion of the system, specifically the computing system, according to the present invention.
Figure 3:
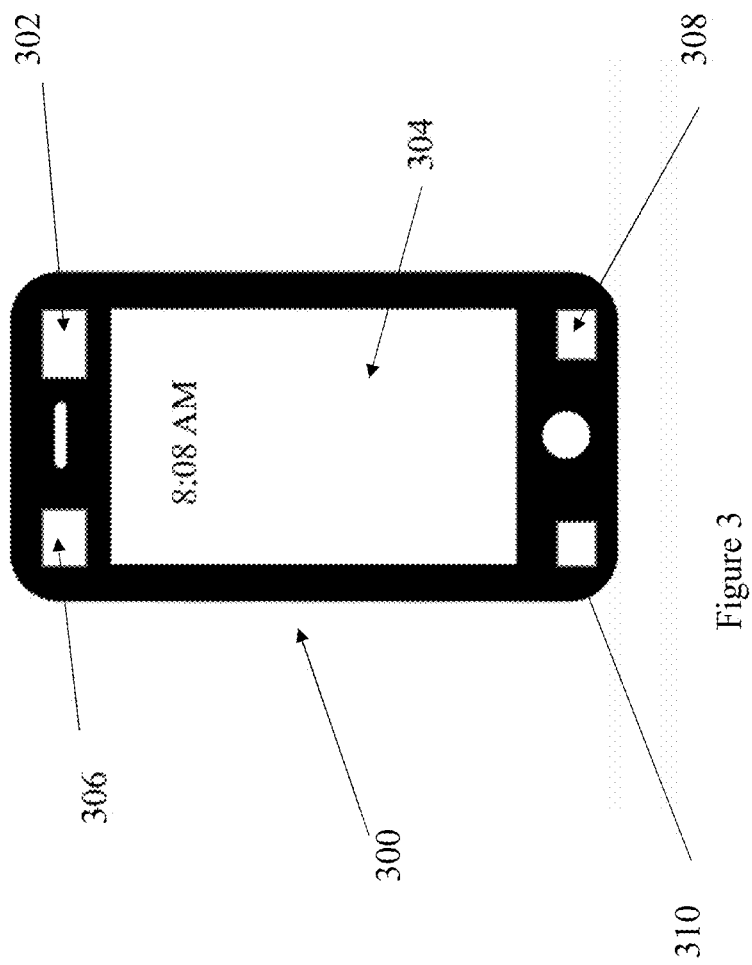
FIG. 3 depicts an example of a mobile platform according to the present invention.

In the following detailed description, a reference is made to the accompanying drawings that form a part hereof, and in which the specific embodiments that may be practiced are shown by way of illustration. The described embodiments may enable those skilled in the art to practice the embodiments and it is to be understood that the logical, mechanical and other changes may be made without departing from the scope of the embodiments. The following detailed description is therefore not to be taken in a limiting sense.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner. Although the invention may be described herein with reference to a modern metropolis such as NYC as the main example for implementation, the system and method is applicable worldwide.

The system and method of the present invention integrates a vehicle Global Positioning System (GPS) for detecting the location of the vehicle and an accelerometer to identify the state of a vehicle output, vehicle's registration information, such as state of registration, database for storing map data, traffic regulation data or penalty data, traffic violation database for storing personal information of the user, means for determining whether there is the possibility that a user commits traffic violations based on the vehicle registration information and traffic regulation data, means for issuing a traffic violation warning in case there is the possibility that the user commits traffic violations, means for determining whether a user has committed traffic violations based on the vehicle registration information and traffic regulation data, and means for storing traffic violation details in the traffic violation database in case the user has committed traffic violations, and a traffic light state information. The historical data is updated and complimented by real-time crowd-sourced data provided by the users.

The system and method integrates an electrical/digital map (e.g. Google Maps™, which is an electronic mapping service provided by Google, Inc., etc.) of the mobile application on smartphone/web-based/storage media. With this integration, the roadways are displayed from the map database which presents the analyzed data as to the location and explanations of ticket violations that are easily understood by the user.

A system of the present invention connects internally with various functions of a mobile device that include but are not limited to the clock function, phone call function, microphone, GPS tracking for geo-location mapping (latitude and longitude coordinates), and/or camera, etc. The mobile application runs on the mobile device and utilizes resources which include microprocessor, memory, GPS, wireless connection and display. The notifications are accomplished through one or more media such as the visual display or audio system, etc.

In the present invention, the term "user(s)" is intended to encompass not only driver(s), but those individuals who may not be a driver or driving but be pedestrians, bicyclists or motorists. The invention may assist all the above users in avoiding traffic tickets. The terms "traffic citation(s)", "traffic ticket(s)", or "traffic violation citation(s)" are used interchangeably, but their meanings are one and the same: a ticket received by a user for a traffic violation.

Exemplary embodiments of the present invention are used by members of the general public and/or computer systems which include but are not limited to: professionals, drivers, bicyclists, motorcyclists vehicles, websites, robots, in-vehicle systems, Global Positioning Satellites (GPS), and/or other systems. It is also intended that exemplary embodiments of the present invention are used not only within a mobile device application of a mobile device, which may include primarily of smartphones, tablets, laptop computers, in-dash vehicle systems, etc., but is also enlarged to encompass other systems or services which may process, utilize, and display the traffic violation-related data, for example, exemplary embodiments of the present invention may contribute to the field of information services for online mapping companies and global positioning system (GPS) manufacturers, smart phone/mobile device manufacturers, wireless service providers, mobile application creators and developers, and mobile operating system developers and distributors, automated vehicle systems that do not require a physical driver in the vehicle etc.

The potential user is asked to register with the service by providing driver, motorcyclist, or bicyclist's license pertinent information such as their name, email address, plate information such as type of plate, type of vehicle, the state/country issuing the driver license to create a user ID for each user of the mobile application. The user IDs are necessary for the purposes of tracking reports and ratings made by each user. The credit card and/or debit card information may also be requested for subscriber fees for certain services the mobile application provides for a certified user. The certified user is allowed to use various features of the mobile application which includes but is not limited to reporting information and rating information. The subscriber fees collected directly or indirectly constantly fund the source used to help pay for the user's incurred tickets as a part of the reward system in order to obtain more ticket information.

The system includes a user profile database configured to store the user information and associations between each user and their mobile device after registering. Once registered, the users set and change their information in their profile. The settings that require a user's input or preference are subsequently changed by the user within the settings of the mobile application (e.g. on/off). For example, the user changes the type of vehicle they are currently driving in the case they switch vehicles if necessary. Accordingly, this is also applicable to the type of plate associated with the vehicle. Additionally, the users who do not possess a vehicle may still be able to select and/or change the settings in order to receive information from the system. The system of the mobile application recognizes two types of users: non-commercial vehicle users and commercial vehicle users. Since different RRLC apply to non-commercial and commercial vehicles, it results in different types of ticket violations which are categorized in the system. The users who indicate in their profile that they drive a commercial vehicle are automatically marked in the different category for only commercial vehicles. The non-commercial vehicles include but are not limited to: passenger cars, mini-vans, SUVs, etc. Within the commercial vehicles database of the system, the type of commercial vehicle is split into categories, which includes, but are not limited to, tractor-trailers, trucks, taxis, and limousines, etc. The traffic rules applicable to commercial vehicles may not also be applicable to non-commercial vehicles, which necessitate the need to separate data from different types of vehicles into different categories so that the tickets may also be categorized depending on the vehicle and the violation reasons. Also, the system of the mobile application allows commercial vehicle users to enter ticket violation information which is separately divided in the database according to categories, of which the reasons may be specific to commercial vehicles. The vehicle type data shows patterns for different types of vehicles which commit the violations. Although there are two types of vehicles that have their respective databases, are combined and integrated in one unified database in the system. The users then be notified about different tickets that occurred at an impact zone and isolated incidents of single violations. The impact zone, which is preset by the user as a distance from the impact location, encompasses an area which is within a certain radius of the location with previously issued traffic violations. The impact zone determines whether a user receives a notification for a driving action not allowed by a certain type of vehicle within the indicated area because of any applicable rules for traffic violations. For example, users whose profiles indicate they are driving a non-commercial vehicle receive a notification when trying to enter a zone for commercial vehicles, while commercial vehicle drivers receive this alert. Through this method, the notifications are more accurate since tickets are grouped in separate categories depending on the type of vehicle and type of vehicle plate, which is included in commercial vehicles or non-commercial vehicles. Since there are different categories within commercial vehicles, the system also sorts and categorizes data depending on vehicle type, plate type and the issuing agency of the specified traffic violation. The information is inferred depending on plate type, vehicle type and issuing agency. Inferring applicable traffic rules based on plate type, vehicle type, and issuing agency. Different traffic rules apply to different drivers depending on the types of vehicle and/or the type of plate they are driving. These rules will be categorized so that when a user registers their driver's license and vehicle information with the system when creating an account, the system will automatically be able to identify the relevant rules that apply to the particular driver and send notifications accordingly. Using violation codes to infer rules. The database may have stored traffic rules with their respective violation codes. When a ticket is uploaded to the system, the system may use the violation code to identify the violation and also infer the location it applies to based on the location which appears on the ticket.

The same rules apply to the same category of vehicle or the same type of plate, which may be regulated by a specific agency. Different issuing law enforcement authorities have different rules and regulations that apply only to the vehicles they have the authority to regulate which necessitates categorization of violation citation data based on types of vehicle and also types of plate in order for the system to provide proper notifications to the users who may be driving different types of vehicles with different type of plates. Accordingly, the system generates alerts as the same rules apply for the same plate type, but also analyzes if such rules apply to different types of vehicles. The system sorts the violation citation data into the same categories that traffic rules apply where each violation citation datum includes but is not limited to time, reasons, location, type of vehicle, and type of plate etc. for the received traffic violation citations. Since some rules apply to all vehicles with all types of plates, then the system sends alerts to all applicable vehicles. For example, in NYC, the Taxi and Limousine Commission (hereinafter, "TLC") regulates commercial vehicles which have a plate beginning with the letter, "T." TLC officers have the authority to issue specific types of tickets unique to TLC vehicles based on TLC regulations but do not have the authority to regulate other commercial vehicles, for example buses, which are regulated by the Department of Transportation.

The system of the current application may then use the data to provide notifications to alert users of the dangerous, accident-prone locations along the city-designated truck routes if the user must drive along those routes to arrive at their intended destination. Additionally, the system may also navigate users on different, less-dangerous routes when possible if the user has indicated in their profile that the user may be a senior citizen, a motorcyclist, or someone who is inexperienced in driving. Avoiding city-designated truck routes will help reduce dangerous accidents because colliding with a commercial vehicle usually causes substantial injuries and deaths.

The system of the application also alerts the user a certain distance beforehand, to the locations of various weigh stations in which the user stops at if they indicated they are driving a truck and/or other commercial vehicles subject to weigh station rules and regulations. As weigh stations are mandatory, this notification helps the users know of the existence of the weigh station so the user properly stops for an inspection. The application also provides alerts that include but are not limited to, weight limitations, size limitations, cargo restrictions, height limitation or clearances, hazmat restrictions, hazardous materials restrictions, etc. This is helpful for all commercial vehicles since the driver is alerted to routes that do not restrict commercial vehicles.

Due to the complexity of traffic rules, it is often very difficult to determine what actions are legally permitted in a given location at a particular day and time. The drivers wishing to abide by traffic rules carefully examine signage that is posted over lanes of traffic and at intersections. However, the traffic signs and lane markings are sometimes not easy to identify or interpret quickly, especially when the vehicle is in motion. Additionally, the traffic signs and lane markings are sometimes partially or fully worn or obscured. Thus, even the most well-intentioned drivers inadvertently commit moving traffic violations.

Exemplary embodiments of the present invention provide a platform for the collaboration and sharing of information regarding traffic citations. There are usually two types of tickets: either a handwritten/machine generated ticket from a law enforcement officer or a machine generated ticket from a street camera image. Different law enforcement agencies also use different forms for ticket violations. The person who receives the ticket may be in the best position to submit suggestions, advice and/or solutions based on their personal experience to advise other users on how to avoid such traffic violations in the future.

Different types of information are inferred by using ticket information containing the violation code. Since violation codes are different depending on the agency that issues tickets and collects ticket penalties, violation codes data input into the system includes violation codes from various agencies and/or statutory codes as they appear when written into law. For example, in New York City, traffic ticket states the Department of Finance Violation Code as "07", which means "vehicles photographed going through a red light at an intersection," and state In violation of NY Vehicle and Traffic Law, Title 7, Article 24, S 1111, Section (d) Obedience of Traffic-Control Red Signal Indications. The system uses these violation codes with the matching section codes and their respective meanings which are stored in the unified database to infer the time frame to which the "No Left Turn" rule applies as "No Left Turn" is usually for 24 hours. The system of the mobile application uses this information to accurately alert the user based on the vehicle's distance and time frame in advance. Inferring time restrictions/time sensitive ("timeframe") rules based on the violation. Similarly the above inferences may be applied to no stopping zones which are typically in effect for 24 hours. The system can infer that a ticket for a location with the reason for the violation as being a no stopping zone, then the system can apply this rule as in effect for 24 hours and users will receive notifications to alert them to this potential violation. Different violations with time restrictions may be applied in this manner (for example: No Parking, No Standing, etc.).

For example, the steps involved with inferring time and location data may be expressed in the following steps: (1) System receives ticket information from user who uploads the information; (2) The ticket information includes several types of information such as time of the violation, location, violation codes, description of violations, and other user or vehicle identifying information; (3) System inputs and stores this information in the database; (4) The ticket may state that the violation was for stopping a vehicle in a NO STANDING ZONE; (5) The reason is entered into the system along with the location, for ex. Flushing, NY where the violation took place; (6) The system will infer from this information/data that the location has a no standing zone sign which typically in the location Flushing, NY is a rule that is in effect for 24 hours a day; (7) Therefore, the system infers and stores the information that the particular location in Flushing, NY is a no standing zone that is in effect for 24 hours a day; (8) Users will receive notifications when they are within a certain distance or are located within the location with the no standing zone violations.

The traffic violation data is processed from various sources that include, but are not limited to the government, government agents, municipalities, non-government organizations (NGO's), private entities, community organizations, interested individuals or users, websites containing useful information such as law enforcement abbreviations, blog posts, social networks, newspapers, professional articles, publically available sources, and any other resources where historical traffic violation-related data is collected etc. (hereinafter, "informational sources"). Some of the traffic violation data is provided as public open data from the government agencies and is also available through a request from the Freedom of Information Act if not available through public government websites. However, when no open government traffic citation data is available, the system obtains historical traffic citation data through the input from the users and/or interested individuals. An administrator of the system also collects traffic citation information from private entities, for example, transportation companies, or any other organizations that specialize in transportation having access to issued traffic citations. The database utilizes a collection system and method for collection of information regarding traffic violation related information from the Informational Sources. The other information from newspapers, blogs, magazines, etc. is collected and summarized by an administrator or employee of the system to supplement the database. This collected traffic citation data is also supplemented by real-time crowdsourced ticket information from the users.

Another source for traffic violation citation related data is obtained by connecting to relevant government or law enforcement websites that store traffic citation information on the specific user. For example, some state Department of Motor Vehicles or Bureau of Motor Vehicles websites maintain a database of motorists, including their convicted traffic violations. Through this connection, the users check their unpaid pending ticket information through the mobile application. Additionally, the system obtains authorization from the user to automatically search for existing violations, whether pending or unpaid, for the user by using identifying information. If there are any violations which are still pending or unpaid, then the system sends a notification to the user about their currently unpaid pending violations. With the authorization from the user, the system uses the information from these violations supplied as data into the historical database to further build the updated comprehensive database to alert other users with the reasons and summary of the historical violations, etc. to avoid future violations.

The government data is available through the applicable authority's website and/or publically accessible open data. Although locations from government data regarding ticket information are not as accurate as geolocation coordinates, but still it is useful because it provides citation data in the major parts that are credible and resourceful. Therefore, locations from government citation data is transformed to geolocation coordinates through various third party software, e.g., Smarty Streets™, which is a location geocoding service for latitude and longitude coordinates provided by SmartyStreets, LLC, before the citation location data is input into the database of the system.

The system and method of the present invention integrates a vehicle Global Positioning System (GPS) for detecting the location of the vehicle and an accelerometer to identify the state of a vehicle output, vehicle's registration information, such as state of registration, database for storing map data, traffic regulation data or penalty data, traffic violation data, user information data for storing personal information of the user, means for determining whether there is the possibility that a user commits traffic violations based on the vehicle registration information and traffic regulation data, means for issuing a traffic violation warning in case there is the possibility that the user commits traffic violations, means for determining whether a user has committed traffic violations based on the vehicle registration information and traffic regulation data, and means for storing traffic violation details in the traffic violation database in case the user has committed traffic violations, etc. The historical data is updated and complimented by real-time crowdsourced data provided by the users.

The system and method integrates an electrical/digital map (e.g. Google Maps™, which is an electronic mapping service provided by Google, Inc., etc.) of the mobile application on smartphone/web-based/storage media. With this integration, the roadways are displayed from the map database which presents the analyzed data as to the location and explanations of ticket violations that are easily understood by the user.

A system of the present invention connects internally with various functions of a mobile device that include but are not limited to the clock function, phone call function, microphone, GPS tracking for geo-location mapping (latitude and longitude coordinates), and/or camera, etc. The mobile application runs on the mobile device and utilizes resources which include microprocessor, memory, GPS, wireless connection and display. The notifications are accomplished through one or more media such as the visual display or audio system, etc.

According to an embodiment herein, the location identifier is a Global Positioning module installed in a mobile device or a vehicle along with the accelerometer. The location identifier and the accelerometer are wirelessly connected to the unified database and the data processing module. The mobile device comprises an internal clock mechanism to identify a current time and date. The location identifier and the accelerometer are connected to the data processing module through either a wired or a wireless medium.

According to an embodiment herein, the central server further comprises a microprocessor and a server readable program storage medium. The program storage medium is non-transitory and tangible in nature. The program storage medium embodies a program of instructions executable by the microprocessor to search and update a historical traffic violation data in a geolocation and assist in avoiding traffic violations. Exemplary embodiments of the present invention can be integrated with in-dash systems to enable the system to fully function within a vehicle. This integration is not limited to in-dash systems and may also be integrated in the vehicle by original equipment manufacture or third-party add-on equipment that is mounted within a vehicle. Exemplary embodiments for direct integration of the disclosed traffic violation avoidance information system into the navigation and GPS System in an onboard computer of original equipment manufactured vehicles. In such embodiments the disclosed architecture is integrated directly into a vehicle's computer system.

When integrated into an in-dash navigation system, the vehicle's display is used to show traffic alerts in accordance with exemplary embodiments of the present invention as described above. The in-dash integrated system embodiment provides remote updates and communications to the user through the installed disclosed violation related information and traffic violation avoidance application on the user's mobile device to alert the user.

The integration includes utilization of vehicle equipment, for example speedometer, accelerometer, cameras, GPS sensor, and any other applicable equipment, etc. The utilization of this vehicle equipment is used to obtain comprehensive real-time and historical activity information about the vehicle, for example its direction, speed, orientation and acceleration, etc. in order to issue applicable alerts to the users.

According to an embodiment herein, the location identifier is a Global Positioning module installed in a mobile device or a vehicle along with the accelerometer. The location identifier and the accelerometer are wirelessly connected to the unified database and the data processing module. The mobile device comprises an internal clock mechanism to identify a current time and date. The location identifier and the accelerometer are connected to the data processing module through either a wired or a wireless medium.

According to an embodiment herein, the central server further comprises a microprocessor and a server readable program storage medium. The program storage medium is non-transitory and tangible in nature. The program storage medium embodies a program of instructions executable by the microprocessor to search and update a historical traffic violation data in a geolocation and assist in avoiding traffic violations.

The mobile application alerts the user to avoid the traffic violation ticket by notifying the user through email, text message, phone call, phone alert, voice mail etc. automatically at the choice of the users who set this in advance in the settings of the system. Functionalities within the system of the mobile application, notably the user reporting function, may connect to third party APIs to provide voice-to-text capabilities. The users who utilize the voice-to-text function record their voice by speaking their statements into the microphone of the mobile communications device, which the system changes to text within the mobile application. Accordingly, the users not necessarily have to enter information manually and submit information to the system by recording their voice statements.

Since the built-in microphone on most mobile devices is not strong enough to record voice prompts from distances that are not in close proximity, the system of the application is paired with a separate speaker attachment/apparatus. This separate speaker attachment/apparatus physically connects to the mobile device and as a result, enables the system of the application to pick up voice prompts from further distances. Therefore, the separate speaker attachment/apparatus allows the user to speak voice prompts up to a certain distance.

The alert system includes a server, database, and forum that receives and processes reports from the users' networked mobile devices. The system processes the information reported from the users who enter such information and upload images of their ticket violations. While ticket information is processed and used to create/update notifications, ticket reporting from the users is also connected to the ticket sharing forum. After receiving this ticket, the user opens the mobile application and press a button to report the location of the violation. The user identifies the type of traffic tickets to be reported from a menu of available pre-determined types. A multi-level menu system is used to guide the user to a selection which identifies the type of possible ticket type. The server receives the report and the user's geolocation and determines additional contextual information that is provided by the user and/or the user's mobile phone from the stored user profile. The system also collects the user supplemented information including, but not limited to, personal knowledge and/or ticket information with the time of the violation, the exact location as printed/written on the ticket, and the reasons for the violation, etc. The users is also required to enter information such as photographs, videos, and written explanations to share their ideas on why the violation occurred in the form in connecting with the traffic violation location.

The abundance of alerts creates the possibility of receiving an unlimited amount of alerts while a user is traveling to their destination. Therefore, the application allows the user to turn these alerts on or off, through voice prompts and/or manually in the settings as described further below, depending on their preference. The turning alerts on or off through voice prompts are applicable when a user is driving. When the user is not driving, the user is facilitated to turn alerts on or off manually in the settings of the application on their mobile device or on the application's website according to the user's preferences. The users are allowed to switch between turning the alerts on or off depending on if they are experiencing too many alerts. If the user switches the alerts to off, the system still allows them to switch it back on when they start on another route again.

Exemplary embodiments of the present invention provide a platform for the collaboration and sharing of information regarding traffic citations. The traffic violation data is processed from various sources that include, but are not limited to the government, government agents, municipalities, non-government organizations (NGO's), private entities, community organizations, interested individuals or users, websites containing useful information such as law enforcement abbreviations, blog posts, social networks, newspapers, professional articles, publically available sources, and any other resources where historical traffic violation-related data is collected etc. (hereinafter, "informational sources"). Some of the traffic violation data is provided as public open data from the government agencies and is also available through a request from the Freedom of Information Act if not available through public government websites. However, when no open government traffic citation data is available, the system obtains historical traffic citation data through the input from the users and/or interested individuals. An administrator of the system also collects traffic citation information from private entities, for example, transportation companies, or any other organizations that specialize in transportation having access to issued traffic citations. The database utilizes a collection system and method for collection of information regarding traffic violation related information from the Informational Sources. The other information from newspapers, blogs, magazines, etc. is collected and summarized by an administrator or employee of the system to supplement the database. This collected traffic citation data is also supplemented by real-time crowdsourced ticket information from the users.

Because of the complexity of traffic rules, it is often very difficult to determine what actions are legally permitted in a given location at a particular day and time. The drivers wishing to abide by traffic rules carefully to examine signage that is posted over lanes of traffic and at intersections. However, the traffic signs and lane markings are sometimes not easy to identify or interpret. Additionally, the traffic signs and lane markings are partially or fully worn or obscured. Thus, even the most well-intentioned drivers inadvertently commit moving traffic violations.

Exemplary embodiments of the present invention provide various methods and systems for tracking a time, date and location of issuance of the traffic citations and alerting users of their proximity to such locations on their approach. In this way, the exemplary embodiments of the present invention save users from incurring costly citations while helping to ensure safer roadways and help preserve the normal flow of traffic.

Another source for traffic violation citation related data is obtained from connecting to relevant government or law enforcement websites that store traffic citation information on the specific user. For example, some state Department of Motor Vehicles or Bureau of Motor Vehicles websites maintains a database of motorists, including their convicted traffic violations. Through this connection, the users check their unpaid pending ticket information through the mobile application. Additionally, the system obtains authorization from the user to automatically search for existing violations, whether pending or unpaid, for the user by using identifying information. If there are any violations which are still pending or unpaid, then the system sends a notification to the user about their currently unpaid pending violations. With the authorization from the user, the system uses the information from these violations supplied as data into the historical database to further build the updated comprehensive database to alert other users with the reasons and summary of the historical violations, etc. to avoid future violations.

The government data is available through the applicable authority's website and/or publically accessible open data. Although locations from government data regarding ticket information are not as accurate as geolocation coordinates, but still it is useful because it provides citation data in the major parts that are credible and resourceful. Therefore, locations from government citation data is transformed to geolocation coordinates through various third party software, e.g., Smarty Streets™, which is a location geocoding service for latitude and longitude coordinates provided by SmartyStreets, LLC, before the citation location data is input into the database of the system. Different types of information are inferred by using ticket information containing the violation code. Since violation codes are different depending on the agency that issues tickets and collects ticket penalties, violation codes data input into the system includes violation codes from various agencies and/or statutory codes as they appear when written into law. For example, in New York City, a traffic ticket states the Department of Finance Violation Code as "07", which means "vehicles photographed going through a red light at an intersection," and state In violation of NY Vehicle and Traffic Law, Title 7, Article 24, S 1111, Section (d) Obedience of Traffic-Control Red Signal Indications. The system uses these violation codes with the matching section codes and their respective meanings which are stored in the unified database to infer the time frame to which the "No Left Turn" rule applies as "No Left Turn" is usually for 24 hours. The system of the mobile application uses this information to accurately alert the user based on the vehicle's distance and time frame in advance.

Exemplary embodiments of the present invention analyze the comprehensive database for statistical patterns regarding traffic violations that are used by the users. Exemplary embodiments of the present invention also utilize data related to commercial vehicles to assist with proper navigation, violation prevention and accident prevention with non-commercial vehicles. The present invention also utilizes a specialized incentive structure to promote participation resulting in successful real-time crowdsourced data. Analyzing the right data to discover patterns on the reasons for traffic violations and providing timely notifications of the reasons produces safer streets by reducing and/or preventing traffic violations through education and awareness.

Exemplary embodiments of the present invention also provide a system and method for the provision of a violation of traffic law, rules or regulations alert wherein a server is configured to send an alert to a mobile device when it indicates the mobile device is traveling towards a location with potential or previous violations and also sends alerts in advance within the preset and/or predetermined distance, such as, for example, 50 or 100 feet, to avoid violations of traffic law, rules or regulations. An accurate database is used to provide an understanding of all the rules applicable to their surroundings according to the type of vehicle and type of plate, which results in potential reduction of violations and accidents. By placing a focus on using ticket information which contains information about the law, the system finds patterns and also explains how the rules, regulations and/or law are applied to the road conditions in real situations for specific locations.

Oftentimes, certain locations are traffic ticket/violation prone due to a specific set of circumstances such as confusion over the rules specific to that roadway/intersection and/or more aggressive enforcement efforts. A user is mostly not able to effectively avoid the traffic violation tickets and other driving situations solely by relying upon existing signage and roadway markings. The exemplary embodiments of the present invention therefore provide alerts, such as actual reasons/causes for the issuing of a citation for a traffic violation so that the user who receives the alert to avoid committing the same violation.

The exemplary embodiments of the present invention crowdsource information about traffic tickets that were reported by users and/or collected by the administrator of the system. The crowdsourcing is a distributed problem-solving method that utilizes online and offline resources to compile services, ideas, and/or content by the solicitation and/or capturing of data from a variety of people native to a special community that is targeted by the crowdsourced subject. The crowdsourced information is used in gathering data that is current, updated, and readily available in real-time in order to provide firsthand information through personal knowledge and/or experiences. The crowdsourcing is also effective in gathering information that is not provided or not timely provided by the government. However, crowdsourcing citation data is costly as the users share their experiences after incurring the costs of ticket violations.

For the purpose of crowdsourcing traffic related information, the system includes a central computer system connected to the internet and the plurality of mobile devices capable of determining their geographic locations according to geo-location and transmitting ticket related information into the central computer system. The central computer system continuously maintains the unified database of the crowdsourced data along with data received from various informational sources, analyzes the user reports, detects patterns for locations or possible individual isolated violations at locations, and provides real time alerts to a plurality of users connected to a network through their mobile communication devices. Each input is assigned a unique tracking number and this unique number is transmitted to the remote server accompanied by the current position of the user/mobile phone.

The method utilizes an incentive method since the unified database incorporates crowdsourced data from the users. The crowdsourcing relies on the participation of a large amount of people who are incentivized for their participation. Basically, this incentive method allows the users to post and share their information in the mobile application to gain credit, which at a certain amount is exchanged for the full or partial amount to cover the ticket received by the user. In this method, the user is rewarded based upon the user's proactive effort to report their ticket information with efficiency, helpfulness, and accuracy. When the users receive tickets, they have the option to dispute or pay the ticket before the deadline. The user is allowed to obtain endorsements for rewards after the ticket information is complete and submitted. When the user shares their ticket information as early as possible to gain payment, the user has a better chance of gaining more endorsements which gains a reward to help pay the ticket violation. Additional credit bonus is issued for the users who share their ticket information as soon as possible to send out the proper notifications to alert other users. The user is required to report and share all the information requested to qualify for the system to pay for his/her ticket and is also important because the user receives endorsements from other users based on the information.

The tickets issued by law enforcement officers indicate a date which serves as the deadline for paying the ticket violation. As an incentive to the users, the system of the mobile application uses a method of rewarding efficient and useful reporting to help the users pay for their tickets through a reward system. The incentives are crucial to obtaining both an active participation from the users and also for obtaining accurate and truthful information. An active participation is important because statistical analysis depends upon a large group of data and it is important to continuously obtain real-time data of current situations.

As the system of the mobile application records and stores accurate geolocation GPS coordinates (longitude and latitudes) of the mobile device, the alerts sent to a user is customized and localized to the user's location within a certain radius which represents the impact zone. Since the database stores and analyzes RRLC from different municipalities and/or other authorities, the system matches geolocation and applicable RRLC to send notifications according to the user's location or a location indicated at a user's request. This function is useful for the users who drive across state/country lines and are unfamiliar with the RRLC from the different states/countries. The system of the mobile application has the user's driver license information as the user enters and store the information of the driver license with the state/country who issued the driver license when registering a user profile. Using the location from where the user's driver license was issued with a user's current geolocation data, the system of the mobile application sends alerts for different rules or a summary of differing traffic rules to the user according to the geolocation as it changes. The users press a button on the display of the mobile application to view the summary of the different traffic rules when comparing the location that issued the user's driver license with the user's current location or any location requested by the user. This method is not only applicable within the different states of the United States of America but also between different countries worldwide. The term Geolocation may be described as the identification of the real-world geographic location of an object, such as a mobile phone or Internet-connected computer terminal.

Exemplary embodiments of the present invention add to the database by using information as reported by the users to update, verify and supplement the database from government data to build the unified database. Exemplary embodiments of the present invention continuously collect, analyze, and update the various citation data to build a more accurate, up-to-date database. The system and method includes an incentive structure paired with an administrative quality control center to ensure the data quality and reliability of the data analyses and the information dispersed to the users.

The raw traffic ticket citation data obtained from informational sources which is uploaded to a computer microprocessor and formatted to include only relevant information needed for running analyses and providing notifications. The uploaded citation data is then split into two sets for cleaning and uploading into the system's server. The first set is citation data which is already verified as having all the necessary information in the right format while the second set is a citation data which needs to be reformatted to include all the necessary information. Once all citation data has been cleaned, the address data is extracted in a data frame to be used in a third party geocode API, for example, Google Geocoding API™, which is a location geocoding service provided by Google Inc., or SmartyStreets™, which is a location geocoding service for latitude and longitude coordinates provided by SmartyStreets, LLC, etc. to output a .csv file with all the geocoded information of locations relative to each ticket. The output is reviewed and corrected by the administrator of the system for accuracy and completeness.

The traffic signs data and RRLC data files are also be uploaded, cleaned and merged with the citation data into the unified database. The sign and road marking information is necessary to indicate the existence of bus lanes, U-turn signs, and school zone speed signs, including limited locations that may be obtained from government websites, or if not available through the websites, may be reported by the users or collected by the employees of the system or third parties hired to collect such information. These road conditions are all indicated with special markings and/or signs. Therefore, these images are entered into the database in the relevant location, which allows the system of the application to provide notifications to the users regarding the existence of these road conditions and information to avoid any violations while driving in the location.

The raw data entered, processed, stored, and analyzed includes but is not limited to: a type of violation, the causes/reasons for the violation, a name of law enforcement officer who issued the ticket, a law enforcement officer comments on the ticket, a registration state, a plate type, a vehicle type, an issue date, a violation code, a violation statutory code, an issuing agency, a violation time, a house number, a street name, law section, a sub division, a violation legal code, day when the traffic rule is in effect, hours in effect, a violation description, and/or any other relevant factors, etc. The reasons for traffic ticket violations include but are not limited to: distracted driving (phone call, texting, eating), speeding, drunk driving, reckless driving, running red lights, running stop signs, night driving, design defects, unsafe lane changes/failure to signal, wrong-way driving, improper turns, tailgating, driving under the influence, drowsy driving, deadly curves, and roadway signs (obstructed), driving in bus lanes, violating rules of the road, illegal U-turn, violating car registration/driver's license requirement, failure to show proof of insurance, use of truck restricted route, etc.

The system may integrate a verification algorithm to detect duplicate data if the tickets issued on dates and times that match those in the database are labeled as duplicate data, which is automatically rejected. However, the tickets issued on dates and times not included in the database are added to the historical database and notifications are updated to properly reflect added data to properly alert the users with updated information.

The database also includes other types of publically available useful and critical resources, for example, abbreviations and their common meanings as used by law enforcement. The law enforcement officers often use abbreviations when issuing tickets. On the ticket, the abbreviations appear in the area where the officer specifies the violation and/or location of the violation. The abbreviations are processed and stored in the database by gathering data from publically available sources to provide the most accurate and up-to-date meanings. The users are able to check the language by using the system to automatically change the abbreviations to plain English meanings according to their location when typing them into the mobile application. The function is also used when a user reports his/her ticket that contains abbreviations. The user for example, types the abbreviated language into the mobile application when reporting, and then the system automatically changes the abbreviations to their plain English explanations and converts the address into a geolocation. For example, tickets with confusing abbreviations, "N/W Hubbard St. 5 ft N/of Ave. Z" would be changed to "North West of Hubbard Street Five feet North of Avenue Z" and then used to create the accurate geolocation through a third party's geolocation API to be entered into the database. The geolocation is then used to alert other users. The users earn rewards if they report any incorrect or inconsistent abbreviations and the administrator of the system verifies and corrects the information.

The database also includes traffic sign information, for example traffic sign location information and traffic sign images from the websites of various government sources (e.g. Department of Transportation, hereinafter "DOT"). If the user does not understand the sign at specific location or has any questions, he or she presses the button to open the forum function connected to the location where the user reports the sign information and views any exchanged information from other users for this sign that is connected to the current location, if such information is available through the system. If traffic sign information is not available from the government resources, the user chooses to submit traffic sign information for the applicable traffic signs where the user qualifies for rewards, and/or have an employee sent to the location to obtain traffic sign information. The traffic sign image notification includes a rating system so the user rates or indicates inaccurate information if there are errors or the sign is missing.

The database also includes traffic signal database that contains details on types, locations, timings, sequences, etc. for traffic signals. This information is obtained through open sources of different jurisdictions and third parties API's, such as for example OpenStreetMap™. The traffic signal information is used to reduce red light violations by informing drivers when the traffic light is about to change or about Red Light Camera locations. Red Light Tickets and Red Light Camera Tickets are the second most common moving violation ticket. In New York, fines for running a New York red light depend on whether the ticket was given by a law enforcement officer or by a camera and may range from $50 for the first offence to $400 for the 3rd offence in 18 months.

Some areas are indicated as special speed zones for an extremely low speed limit. For example, some areas in which a vehicle may only travel at 5 mph are indicated by extra-large signs with words in a larger font. The system of the application also sends notifications to the users for these special speed zone areas. To do this, the system utilizes images taken from the sensors installed on the user's vehicle. The sensors capture an image of the sign which indicate the speed which is applicable to the certain location where the vehicle was traveling. The image is uploaded to the database to be processed and analyzed. Once the image is processed by the system, it automatically sends out notifications to the user regarding the existence of an extremely low speed limit when the user is traveling towards the location and/or in the location.

Another method for preventing violations within a school zone relates to the existence of speed cameras within a school zone. There are two types of speed cameras that exist within school zones; stationary and mobile installed in law enforcement vehicles. The stationary speed cameras stay in the same location since they have been installed at that location. However, the mobile speed cameras are attached to vehicles and are moved by a law enforcement officer. Information regarding the geo-location GPS coordinates of a school building (public, private, or any other type of school building) may be input into a database. The location data is available online in some locations, which is easily input into the database. These coordinates serve as the basis for notifications within a certain radius to be set by the administrator according to the RRLC data. A user is sent notifications alerting them if they are within 1 mph or 2 mph of the allowable speed limit according to the user preferences and/or when they are already driving over the allowable speed limit. Although the current systems notify the users as to the location of a speed camera, this information is useless if the user is already speeding within the camera's reach. Also, mobile speed camera locations can change; therefore it is better to notify a user within a certain radius of the school building regardless of the direction in which the user is traveling. For example, the RRLC in New York states that the speed camera may be within a quarter-mile (¼ mile) of the entrance or exit of a school building and also on the same road as such entrance or exit. The RRLC in New York also states that the speed camera can actively operate up to thirty (30) minutes before the opening and thirty (30) minutes after the closing of the respective school. However, many schools in New York for example, conduct pre-school activities and/or after-school activities and therefore the general hours at which a school may operate may be from 6:30 AM to 7:00 PM. Since this is the time frame, the respective data regarding the applicable time frame may be input into a database. The speed limit for the school building also be input into the database. According to RRLC in New York, the speed camera issues a ticket when the vehicle is traveling at 10 mph or up over the posted speed limit. The administrator sets a 0.1 mile radius within the geo-location GPS coordinates of the school as the applicable area in which the user should receive notifications. The system is then able to send a notification when a user is within this 0.1 mile radius of a school and within 1 mph or 2 mph of the allowable speed as set by user preferences. A radius method is used here because simply tracking the geo-location GPS coordinates is not enough since the notification or alert appears too late when the user is already within the capture distance of a speed camera. A user adjusts the distance for the notification to alert them at a certain distance further than the 10 meters, for example 30 meters etc., where the camera captures its speed. The user may also select a predetermined amount of time in advance for the notification to alert them. For example, the user may elect to be notified one minute in advance, 30 seconds in advance. As a result, a user does not have to worry about the existence of either a stationary or mobile speed camera since the user is alerted to the applicable safe speed and avoid a ticket violation if they follow the information stated in the notification. The stationary or mobile speed cameras are not limited to school zone areas and exemplary embodiments of the present invention may be used to alert users of speed cameras in other applicable areas. In any case, the system provides alerts in advance of speeding and also alerts when already speeding. This concept also encompasses red light cameras. Red light cameras are stationary and record an image of the vehicle as it passes through a red light. Tickets may be issued for violations of running a red light. The system will store locations of red light cameras and will provide indicators in different formats, such as colors, shapes, and lines, etc. to indicate the locations of these red light cameras. The user may select a predetermined amount of time or a predetermined distance in advance of approaching a location with a red light camera for the notification to alert them.

The system of the application also allows the user to set the number of miles over the speed limit in which the notification may appear. Therefore, the user sets for example, fifteen (15) mph over the speed limit before the application notifies the user that the user is driving too fast. The user also changes this amount in the settings of the application in the case the user would like to lower or increase the amount. This notification also includes an alert to the user on suggestions, advice and/or solutions on how to avoid receiving another ticket violation for this same reason of speeding. This example regarding a user who is prone to speeding is also applicable in situations where the user drives excessively under the speed limit which causes danger in the surrounding environment. The system of the application allows the user to set the number of miles under the speed limit in which the notification about under speeding appears. This number is adjusted in the settings of the application according to the preferences of the user. In the event the mobile device is outdated and/or does not possess an internal speed tracking system, the user attaches a separate apparatus, the "speed processor" which connects with the application to accurately track and record the user's speed.

The user is able to set these different distances in the settings of the application. The user is also allowed to change these distances at their discretion through a voice prompt and/or manually by returning to the settings of the application. The system of the application uses voice recognition software which connects to the microphone of the mobile phone, to allow the user to turn off the notification by speaking a voice prompt within a certain amount of seconds after such notification appears, such as "shut off" or "please turn off" etc. for example, if the user does not want to be notified of the same message again. The reasons for a user not wanting to hear the same notification again include, but are not limited to: familiarity with the area and/or location or the high frequency of the same type of notification, etc. To avoid the negative impact of having too many notifications bombarding the user when using the application, a voice prompt allowing the application to cease providing a certain notification is included as it is helpful for the user to sort and customize their settings. The system of the application is able to recognize the voice prompt through its voice recognition software and turn off that particular notification. Also, through this voice prompt, the system of the application knows that it should not provide the same notification to this user in the future. The user is also facilitated turn off the particular notification manually when they are not driving. If the user changes their mind and would like to receive a particular notification again, the user manually turns on the notification feature again for that type of notification within the settings of the application. With this customization, the application only notifies and/or reminds users of things a user wants and/or needs to know about.

Other functions of the application which connect with the time function of a mobile phone involves time related regulations. For example, the idling penalties for having the vehicles engine running in a certain space while stationary. In some areas, such as New York for example, drivers are issued a violation ticket for idling for over three (3) minutes in a location that does not allow idling. The ticket penalties for idling in New York can range from $100 to $2,000. To prevent the user from receiving this type of violation, the system of the application connects with the internal time function of the mobile device in addition to the geo-location system to verify the time and exact location of the user. The administrator of the application has entered specific data on RRLC into the system's database. When a user is stationary for a certain amount of time, to be set by the administrator of the application, as determined by the GPS geo-location and internal clock functions of the mobile device, the system of the application automatically records the user's location through GPS location functions, search for any applicable time related restrictions in addition to starting an internal timer to record the amount of time the user has been stationary. The system of the application searches the relevant database information for RRLC about how long a vehicle idle at that exact location. After tracking the time, the system of the application then sends a notification to the user with related penalty information once the user exceeds the time allowed to be idle at that specific location. The notification triggers the attention of the user and the user then decides to move the vehicle to mitigate the risk of receiving an idling violation ticket. In this method, the application helps the users avoid penalties while also keeping the environment clean since the users are less likely to idle for long periods of time and may decide to park elsewhere instead.

Another method of determining whether a vehicle is idling concerns the usage of a sensor that connects to the vehicle's engine to be able to tell whether the engine is on or off. If the engine is on then the internal timing mentioned above tracks how long the vehicle has been stationary and provide the applicable alerts to prevent idling violations. A speed sensor, accelerometer or the GPS can each be used to determine if the vehicle is moving or idling. Once the system determines a car is not moving, the internal timing starts running to record the amount of time the car is idling. If the engine has been shut off, this signals that the vehicle is in park mode. One issue with this method is that a vehicle could be stopped at a red light. To resolve this issue, the system tracks the timing of the vehicles stationary status, speed and location. If the user is in stationary mode for more than one minute, then the system automatically starts to track the time in the event there is a potential idling violation. Since the system integrates a road map in the database, if the vehicle is on a road, the system also recognizes this through the geo-location GPS coordinates to identify the users' location since different jurisdictions may have different idling rules. For example, in NYC a vehicle other than an authorized emergency vehicle, that is parked with its engine running for more than three minutes, or parked next to a school with its engine running more than one minute, is committing an idling violation, whereas under New York State law, vehicles may not idle for more than 5 consecutive minutes.

The application is not limited to the alerts described above. Other functions of the application relating to alerts include but are not limited to bus lane and any other potential traffic violations, etc. The bus lane is a travel lane restricted to buses only during certain hours of the day. During this time, other vehicles may enter a bus lane only to make the next available right turn, or to quickly drop off or pick up passengers. Violating a bus lane rules results in a $115-$150 fine. NYC enforces bus lanes in two ways through bus lane cameras and police enforcement. The city has installed cameras along bus lanes to catch violators. The signs are posted along routes that have bus lane cameras as an extra warning for drivers to keep out of bus lanes, except for allowed right turns and passenger pick-ups and drop offs. The police enforcement or NYPD regularly patrols bus lanes, and issues moving violations to bus lane violators. To help the users avoid bus lane violations, the system may inform the users is advance when they are approaching bus lane. The bus lanes are identified on electronic maps through colors. For example, the bus lane sign says that entering the lane is prohibited between 7 AM and 7 PM. In that case, the system marks the bus lane area in red color to inform the user that entering is prohibited. The bus lane information is obtained from government websites and updated through traffic citations, the user reports or employees of the system.

According to an embodiment herein, different formats are used to identify density of issued traffic violation citations at specific locations or for broad or narrow geographic areas, such as a borough, block or street. The format further identifies a plurality of fluctuations in number of issued traffic violation citations reflected at specific locations based on the time of the day and historical traffic violation summary data for said location at time of the day. The users of commercial and/or non-commercial vehicles view different identification maps. Thus, the users of the application are able to know whether there is a potential violation at a particular location in advance even before the user starts the trip so as not to break the rules and not to be issued a traffic ticket. Therefore, the traffic ticket violations are substantially reduced by the users of the application who are able to share their traffic violation ticket information, suggestions, advice, and/or solutions through this application.

In addition to other indicators or other formats, such as colors, shapes, voice notification, text message are used to identify violations with time restrictions. The time restriction is a time frame where certain actions, such as for example, turning right or left, is not allowed within a certain location, which may be used to help the system produce time sensitive alerts when applicable. The data reflects an accurate time frame for these violations rather than track each time as its own specific instance of a violation and notifies the users about the entire time frame when specific actions, such as, for example, turning, is prohibited, and not just a specific time point as indicated on the ticket.

The user is allowed to do a general search for violations in the specific location within the forum or within the system. If the search does not result in an answer that satisfies the user, the users have the option to post their own inquiry in the forum connecting to the specific location. By educating the users through sharing their own experience, other users are more conscious of their driving actions, which help in the avoidance of receiving tickets and/or overall reduction of traffic ticket violations. All functions of the mobile application, such as notifications and the forum is available in different languages that can be changed by the user. The system uses a third party service and/or API, for example, Google Translate™, which is a language translation service provided by Google Inc., or the administrator of the system may hire professionals and competent translators to translate the content to different languages or provide explanations in plain English or any other language. The users also translate information, which is subject to ratings.

The forum functionality incorporates two aspects: a forum which is connected to the specific location of violations on the electronic map of the system of the mobile application or a general forum where users discusses general ideas not related to specific locations. The user presses on a location related to traffic violations within the map display to choose "Forum," to access the forum function which includes different categories where information may be exchanged between the users, for example, tickets sharing; questions or answers or comments; traffic signs; and/or any other different category not included in the above, if any etc. The tickets sharing category allows a user to view comprehensive, detailed information for the location applicable to the ticket violation including but not limited to a copy of the ticket without sensitive information; reasons for the violation; time of the violation; and an advisory to avoid the violation, etc. The sensitive information, such as name of the driver, VIN number of the vehicle, plate number and address is redacted from the ticket either manually by the user or automatically by the system. The questions or answers or comments category allows a user to ask any questions, input any answers, and input any comments related to traffic violations for the location in addition to viewing all this information contributed by other users. The traffic signs category allows the users to exchange information regarding traffic signs. Other categories not included in the above are added or deleted at the discretion of the administrator of the system. When a user has an inquiry regarding traffic violation related information for a location, the mobile application allows the user to post using the forum function to obtain more information. The user inputted information is open to comments and/or ratings from other users. The comments with the highest endorsements are given priority ranking for the position of the comment either at the top or the bottom of the list. If endorsements reach a certain amount then the user may receive a credit or reward. The forum may allow other users to provide various comments that include but are not limited to similar tickets and/or situations, dispute rates, and other information on whether a dispute may be successful based on provided circumstances from the user who received the traffic ticket.

The users use the forum to post a picture of a traffic/street sign at a specific location and ask about the plain language of the sign. The users often experience difficulty in understanding traffic signs, especially when there are multiple signs for different traffic rules. In addition, many drivers do not have a strong command of the English language or any other language that the sign is written in, which leads to further difficulties in interpreting the signs. Therefore, the mobile application may provide information in the forum on the specific location of the traffic signs and translate these traffic signs into easy-to-understand, plain terms. Since some traffic signs are confusing, the users participate in redesigning them to make new designs. The users create redesigns or translate traditional traffic signs to different languages to be more understandable. Their design images are subject to a rating system and the top design which generates the most positive ratings over a certain number after a certain amount of time may be rewarded. The top rated design remains at the top of the list in the forum so other users can view and easily understand the meaning of the signs.

The system of the mobile application also educates the users on the process of disputing tickets if a dispute is meritorious. It is often the case that users are unsure whether to dispute and how to dispute the ticket violation. The user utilizes crowdsourced ticket resolution information from other users to find out whether their ticket have a good chance of being dismissed if disputed based on information submitted by other users. The dispute procedures include information on the types of evidence that are collected and submitted to the proper authority who adjudicates the dispute. The user is also allowed to search and connect with third parties, such as lawyers who have registered with the system and who are experienced in disputing ticket violations. The mobile application allows the user to email pictures and other types of documents to the third-party directly from the mobile application. The mobile application's forum functionality also allows the users to share information on their hearing and results of their hearing for their tickets. The other users use this information as a reference for future hearings since the users are able to see other users who have gotten the same type of ticket in the same location for the same reasons. The system also uses this information to conduct analyses on locations that have unusual ticketing activity to initiate guidelines to the users.

The user supplements reported information with photos of the location and any written explanations in addition to the photographs in the forum that is connected to the location of the violation. If the user takes a picture of the ticket to upload to the system database, the mobile application allows the user to edit the image with an image editing function by covering/blurring information and/or sharpening the image prior to uploading the picture. The users cover/blur parts of the images with sensitive information, for example name, plate number, or vehicle identification number etc. Using optical character recognition to sharpen blurry images increases the success rate for a computer to recognize the information in the image. As an alternative, the system also allows a user to scan the traffic violation citation by utilizing mobile device camera with scanner software downloaded into their mobile device.

Reported information is subject to a review and/or ratings by the administrator of the system and also other users to ensure that credible information is being collected to provide notifications. The comments, suggestions, etc. may be listed in the forum according to ratings, and the ones with the highest amount of positive ratings are listed at the top, wherein the comments with least positive ratings are listed at the bottom so other users clearly view the postings to gain the best knowledge. The users are allowed to report to the administrator of the system any information they deem inaccurate. The administrator of the system is able to open a case where an employee and/or a user will be sent to conduct an investigation of the purported inaccurate information to verify the quality of the information. The rewards are provided for the user of the mobile application who may have assisted in the investigation.

The notifications within the mobile application are short alerts stating the reasons on why a user may be committing a traffic violation with brief information that summarizes the historical violation data at the location. The notifications are brief because the users receive these notifications on their mobile communications device and are either driving to their intended destination or distracted from conducting other activities. The notifications alerting the users are generated based on the different categories, types of vehicles, and/or type of plate applicable to the user receiving the notification. One type of notification include information about the potential violation such as dates and time frame applicable to the violation, if available, historical summary of violation citations at the current location, reason(s) for the violation, etc. The historical summary of ticket information contains a time frame from certain dates that are reflected in the data (for example, date, month, time, etc.), traffic violation reasons, applicable penalties, total penalties collected, categories of ticket types and their applicable penalties, and the number of tickets issued within the time frame to educate the User and act as persuasive information in order to inform the user of the potential consequences to avoid the user from taking a chance to perform the prohibited driving action in the location with violations.

The sharing of information triggers the application to send useful notifications to other user who benefits from the information based on the location and/or circumstances. Therefore, when the system of the application recognizes other users who are in the same location at the same time, the application automatically provides a notification indicating important, resourceful information that includes but is not limited to: the violation(s), specific reasons why there is a violation(s), any related penalties, alternatives to committing a violation, etc. For example, a user who constantly is driving over the speed limit and receiving tickets for speeding only benefits from the application's notifications if they were alerted of speed violations and also suggestions, advice, and/or solutions on how to avoid the same violation. For example, in New York City as of Nov. 7, 2014, the 25 mph default citywide speed limit will affect all streets where there is no posted speed limit. The existing "gateway" signs that read "NYC LAW SPEED LIMIT 30 UNLESS OTHERWISE POSTED" are changed to new signs that reflect the 25 mph default speed limit. Some larger streets, such as limited access highways or major arterial streets, have posted speed limits of 30 mph and above; these remain in place while DOT evaluates these locations. Some smaller streets where traffic calming measures have been implemented, like schools, are signed for speeds less than 25 mph. All streets that do not have a posted speed limit have a speed limit of 25 mph as of November 7th. The general speed limit information is obtained through government websites, whereas the speed limit for particular streets is obtained through traffic citations, employees of the applications and the users' reports. The administrator looks into the information to see if there are any special reasons for the speed limit change. Once verified, the administrator is able to broadcast this information to users stating that the RRLC has changed for this specific location. In addition, the system of the application now automatically sends notification alerts to users driving at 30 mph or 31 mph for that specific location depending on the user's preferences, since the new violation speed is posted at 32 mph. This applies unless there are special areas with especially low posted speed limits as further described below.

Another type of notification appears when the system displays a comparison of traffic rules applicable at different jurisdictions, for example, rules that apply at the current location and rules of the state that issued the user's driver license. Among other instances, the user are able to view this notification information at any time, by pressing a button on the screen of their mobile device at the location to check for traffic violations or to check for differing traffic rules. The users rate the information on the notification and also report the notification to the administrator of the system if they think there is inaccurate or false information.

Exemplary embodiments of the present invention include a method and system of a mobile application for mobile device notifications in different situations. These notifications are generated from the unified database that involves the processing and analysis of several data set components: available historical and compiled data from informational sources, real-time data as crowdsourced from the user's inputted traffic violation related information, crowdsourced traffic violation dispute related information to assist/advise ticket disputes, rules and abbreviations data, traffic sign locations and traffic violation penalties data, ticket dispute data from the users and any and all supplemental information as provided and/or verified by the administrator of the system, all of which are subject to review and/or ratings. The data is labeled in the database according to its source. The system may hire a team of professional individuals with relevant expertise in traffic violations and/or traffic rules in order to provide more accurate data for the database. The notifications are changed or updated depending on data gathered and the user reports.

Since notifications are short and meant to alert the users with quick summarized information about the potential traffic violation, the user utilizes the forum function to obtain more comprehensive and detailed information from forum posts which includes but is not limited to inquiries, responses, discussions, pictures, videos, written descriptions, and any other information that is posted. While reported ticket text information is used to generate/update the content appearing in notifications, all of information provided in ticket sharing goes to the ticket sharing forum (e.g. photos, videos, etc.). The users access the forum and all its contents from the mobile application regardless of the user's current location while notifications are displayed only when the user is approaching the specific location with previous issued traffic violation citations. The information provided by the users in the forum supplements and update information provided in notifications. The combination of receiving notifications and accessing a forum may provide more useful and extensive information for the users because notifications provide quick, time sensitive information while the forum provides the detailed, extensive information useful to gain full knowledge of the situation.

In addition to other indicators, notifications are sent based on violations with time restrictions. The time restrictions is a time frame where a certain driving actions are not allowed at a certain location, which is used to help the system produce time sensitive alerts when applicable. The data reflects an accurate time frame for these violations rather than track each time as its own specific instance of a violation and notifies the users about the entire time frame when the driving action is prohibited, and not just a specific time point as indicated on the ticket.

The time frame data is applicable to for example "No Left Turns, 7 AM-10 AM", so any user whose geolocation data shows they are in that particular location receives a notification during the applicable time. The system connects with the internal clock mechanism of the mobile communications device to send an automatic notification, reminding the user to that left turns are not allowed because the user is driving in that location within the hours of 7 AM through 10 AM. For quality control purposes, the system of the mobile application integrates a verification system. For rewards, the system tracks ratings so that users only endorse one time for every ticket report. Additionally, the user only rates the notification of potential traffic violations if the user has firsthand experience of such traffic violation and received such notification when a user's geolocation is indicated to be within a certain radius of the location with violations which is the impact zone and generates the notification from the user who reported. Such users who have received the notification based on their firsthand experience can either endorse (positive) or rebut (negative) when rating the notification. These values are changed as necessary at the discretion of the user. Therefore, the application displays various route options for the user when the user searches for a route using the navigation function before they start traveling on the route and informs about traffic signs, applicable rules and red light cameras along the way.

For example, truck routing in New York is highly regulated. The type of truck route that the user must take depends on the origin and destination of user's trip and therefore, classification of the truck type by the user is very important for the route planning. All vehicles defined as a truck (two axles and six tires, or three or more axles) are required to follow the Truck Route Network. Commercial vehicles that do not meet the definition of a truck are not required to follow this network, but must follow all posted signage regarding the operation of commercial vehicles. Both trucks and commercial vehicles cannot travel on most parkways in New York City.

The Truck Route Network is a set of roads that commercial vehicles must use in New York City. This network is comprised of two distinct classes of roadways, Local Truck Routes and Through Truck Routes. The network is defined in Section 4-13 of the New York City Traffic Rules.

The Local Truck Route Network is designated for trucks with an origin and destination within a borough. This includes trucks that are traveling to make a delivery, or for loading or servicing. Trucks should only use non-designated routes for the purpose at the beginning or end of a trip, when traveling between their origin/destination and a truck route.

The Through Truck Route Network is primarily composed of major urban arterials and highways and must be used by trucks that have neither an origin or destination within the borough.

For example, a truck trip that starts in Staten Island and ends in Queens would be required to use the Through Route Network while passing through the borough of Brooklyn en route to Queens. If the destination in Queens was not immediately accessible from the Through Truck Route, the driver would then have to travel on the Local Truck Route Network to complete his or her trip. However, a truck going from one end of Queens to the other is permitted to travel on the local truck route network.

Manhattan and Staten Island contain Limited Truck Zones with special time and size restrictions.

The Application may alert the driver in two ways. When using the navigation function to search for routing information to get to a certain destination, the User can enter in relevant information to provide the User with navigation information that includes but is not limited to the height of the truck, the weight of the load on the truck, and whether the truck contains any goods that are subject to restrictions such as hazmat materials, etc. These values may be changed as necessary at the discretion of the User. Therefore, the Application may display various route options for the User when the User searches for a route using the navigation function before they start traveling on the route and informs about traffic signs, applicable rules and red light cameras along the way. The various route options may indicate specific reasons why one route is better than the other due to certain applicable restrictions on the route. Another way of alerting the User is when the User is a certain distance away from a location (bridges, tunnels, highways, etc.) that has a special government restriction for the type of vehicle the User is driving, then the Application may alert the User so the User can avoid this route.

When a User enters a start point and destination, they may be given several route options where they can then choose which route they would like to take according to whether it is the fastest route or whether the route has had less ticket violations by taking into account real-time traffic information. These options may be provided by tracking the both real-time traffic information and also the history of the violations in the area in the Application database. The various route options indicate specific reasons why one route is better than the other due to certain applicable restrictions on the route. Another way of alerting the user is when the user's location a certain distance away from a location (bridges, tunnels, highways, etc.) that has a special government restriction for the type of vehicle the user is driving, then the application alerts the user so the user is able to avoid this route.

A reward is issued for the first user who reports ticket information at a location that has no prior ticket history of traffic violations in the unified database. The maximum amount the user receives may be the total amount stated on the user's ticket or any other amount that is set by the administrator of the system according to the amount of positive ratings they have received for providing their ticket information along with comments and recommendations on how to avoid traffic violation citations. Through rewards, the users incur no losses from ticket violations and also educate others to better comply with RRLC by sharing ideas to avoid future traffic ticket violations. The reward system involves several steps. In order to be eligible, the user is required to be the first user to fully report the ticket information in detail for that specific location that did not have any prior ticket history by reporting the date, time from the issued ticket, with specific information on the reasons for the ticket and also must give beneficial suggestions, ideas, and/or advice on how to avoid the same violation. Only the first user who shares the full details of the ticket information and receives a certain number of ratings may receive a reward. Any other users who try to report the same type of tickets at that location with the same reasons are notified that they do not qualify for a reward that is the same as the first user. However, the users are allowed to enter their ticket information if the ticket for the same location indicates different reasons/violations which may qualify for a reward. The mobile application allows a user to take a photo of the ticket, which is optionally edited before submission as described previously. Each location allows for the submission of one original ticket report which allows one user to gain a reward. However, the administrator of the system changes the type of reward and/or amount of reward to different users who report traffic ticket information by descriptions in different circumstances. For example, a reward for the first user pays double amount of the reward or give a gift as a monetary reward.

The ticket violations are legal documents and are subject to disputes. When a user wants to dispute the ticket violation, the forum in connection with the location of the traffic citation is useful because other users comment on their personal situations on whether a dispute is likely to be successful or meritless. The system crowdsources within the forum for traffic violation related dispute information from a plurality of users in order to assist the users with useful dispute information. This dispute information is also useful for the users who encounter a law enforcement officer and uses this information to discuss and explain the situation to them. The user shows the law enforcement officer that in fact, other users who have received the specific traffic ticket violation have disputed it in court and have won. The law enforcement officer, who is now informed of the situation, may or may not issue the ticket violation or may revoke the ticket violation as a result if the officer has the power to do so. This method saves the users money because if the dispute has merit as reported by others, the user has a chance to win the case. If the dispute does not have merit as reported by other users, then the user decides to just pay the fine and not dispute the ticket. The information related to disputes is used to inform other users of ticket dispute probabilities. The administrator of the system also hires professionals who specialize in traffic ticket disputes to assist in resolving dispute issues in the forum. The mobile application allows a user to check dispute probabilities through pressing a button on the display that connects to the database of traffic violation tickets received by other Users. Accordingly, the users are educated on how to use legal remedies with efficiency. The application alerts the driver in two ways. When using the navigation function to search for routing information to get to a certain destination, the user enters in relevant information to provide the user with navigation information that includes but is not limited to the height of the truck, the weight of the load on the truck, and whether the truck contains any goods that are subject to restrictions such as hazmat materials, etc.

Some areas are indicated as special speed zones for an extremely low speed limit. Low speed limit zones are meant to increase safety by reducing opportunities for illegal speeding and aggressive driving. These zones can also enhance pedestrian comfort and flow of traffic. For example, some areas in which a vehicle may only travel at 5 mph are indicated by extra-large signs with words in a larger font. The system of the application also sends notifications to the users for these special speed zone areas. To do this, the system utilizes images taken from the sensors installed on the user's vehicle. The sensors capture an image of the sign which indicate the speed which is applicable to the certain location where the vehicle was traveling. The image is uploaded to the database to be processed and analyzed. Once the image is processed by the system, it automatically sends out notifications to the user regarding the existence of an extremely low speed limit when the user is traveling towards the location and/or in the location.

Another method for preventing violations within a school zone relates to the existences of speed cameras within a school zone which are used to to improve safety at schools with the highest accident rates. DOT examined accident histories around the city's 1,471 elementary and middle schools and is working new traffic and pedestrian signals, high visibility crosswalks and other safety improvements. For example, there are two types of speed cameras that exist within school zones; stationary and mobile installed in law enforcement vehicles. The stationary speed cameras stay in the same location since they have been installed at that location. However, the mobile speed cameras are attached to vehicles and are moved by a law enforcement officer. Information regarding the geo-location GPS coordinates of a school building (public, private, or any other type of school building) may be input into a database. The location data is available online in some locations, which is easily input into the database. These coordinates serve as the basis for notifications within a certain radius to be set by the administrator according to the RRLC data. A user is sent notifications alerting them if they are within 1 mph or 2 mph of the allowable speed limit according to the user preferences and/or when they are already driving over the allowable speed limit. Although the current systems notify the users as to the location of a speed camera, this information is useless if the user is already speeding within the camera's reach. Also, mobile speed camera locations can change; therefore it is better to notify a user within a certain radius of the school building regardless of the direction in which the user is traveling. For example, the RRLC in New York states that the speed camera may be within a quarter-mile (¼ mile) of the entrance or exit of a school building and also on the same road as such entrance or exit. The RRLC in New York also states that the speed camera can actively operate up to thirty (30) minutes before the opening and thirty (30) minutes after the closing of the respective school. However, many schools in New York for example, conduct pre-school activities and/or after-school activities and therefore the general hours at which a school may operate may be from 6:30 AM to 7:00 PM. Since this is the time frame, the respective data regarding the applicable time frame may be input into a database. The speed limit for the school can also be input into the database. According to RRLC in New York, the speed camera issues a ticket when the vehicle is traveling at 10 mph or up over the posted speed limit. The administrator sets a 0.1 mile radius within the geo-location GPS coordinates of the school as the applicable area in which the user should receive notifications. The system is then able to send a notification when a user is within this 0.1 mile radius of a school and within 1 mph or 2 mph of the allowable speed as set by user preferences. A radius method is used here because simply tracking the geo-location GPS coordinates is not enough since the notification or alert appears too late when the user is already within the capture distance of a speed camera. A user adjusts the distance for the notification to alert them at a certain distance further than the 10 meters, for example 30 meters etc., where the camera captures its speed. As a result, a user does not have to worry about the existence of either a stationary or mobile speed camera since the user is alerted to the applicable safe speed and avoid a ticket violation if they follow the information stated in the notification. In any case, the system provides alerts in advance of speeding and also alerts when already speeding. The system of the application also allows the user to set the number of miles over the speed limit in which the notification may appear. Therefore, the user sets for example, fifteen (15) mph over the speed limit before the application notifies the user that the user is driving too fast. The user also changes this amount in the settings of the application in the case the user would like to lower or increase the amount. This notification also includes an alert to the user on suggestions, advice and/or solutions on how to avoid receiving another ticket violation for this same reason of speeding. This example regarding a user who is prone to speeding is also applicable in situations where the user drives excessively under the speed limit which causes danger in the surrounding environment. The system of the application allows the user to set the number of miles under the speed limit in which the notification about under speeding appears. This number is adjusted in the settings of the application according to the preferences of the user. In the event the mobile device is outdated and/or does not possess an internal speed tracking system, the user attaches a separate apparatus, the "speed processor" which connects with the application to accurately track and record the user's speed.

The user is able to set these different distances in the settings of the application. The user is also allowed to change these distances at their discretion through a voice prompt and/or manually by returning to the settings of the application. The system of the application uses voice recognition software which connects to the microphone of the mobile phone, to allow the user to turn off the notification by speaking a voice prompt within a certain amount of seconds after such notification appears, such as "shut off" or "please turn off" etc. for example, if the user does not want to be notified of the same message again. The reasons for a user not wanting to hear the same notification again include, but are not limited to: familiarity with the area and/or location or the high frequency of the same type of notification, etc. To avoid the negative impact of having too many notifications bombarding the user when using the application, a voice prompt allowing the application to cease providing a certain notification is included as it is helpful for the user to sort and customize their settings. The system of the application is able to recognize the voice prompt through its voice recognition software and turn off that particular notification. Also, through this voice prompt, the system of the application knows that it should not provide the same notification to this user in the future. The user is also facilitated turn off the particular notification manually when they are not driving. If the user changes their mind and would like to receive a particular notification again, the user manually turns on the notification feature again for that type of notification within the settings of the application. With this customization, the application only notifies and/or reminds users of things a user wants and/or needs to know about.

Other functions of the application which connect with the time function of a mobile phone involves time related regulations. For example, the idling penalties for having the vehicles engine running in a certain space while stationary. In some areas, such as New York for example, drivers are issued a violation ticket for idling for over three (3) minutes in a location that does not allow idling. The ticket penalties for idling in New York can range from $100 to $2,000. To prevent the user from receiving this type of violation, the system of the application connects with the internal time function of the mobile device in addition to the geo-location system to verify the time and exact location of the user. The administrator of the application has entered specific data on RRLC into the system's database. When a user is stationary for a certain amount of time, to be set by the administrator of the application, as determined by the GPS geo-location and internal clock functions of the mobile device, the system of the application automatically records the user's location through GPS location functions, search for any applicable time related restrictions in addition to starting an internal timer to record the amount of time the user has been stationary. The system of the application searches the relevant database information for RRLC about how long a vehicle idle at that exact location. After tracking the time, the system of the application then sends a notification to the user with related penalty information once the user exceeds the time allowed to be idle at that specific location. The notification triggers the attention of the user and the user then decides to move the vehicle to mitigate the risk of receiving an idling violation ticket. In this method, the application helps the users avoid penalties while also keeping the environment clean since the users are less likely to idle for long periods of time and may decide to park elsewhere instead.

Another method of determining whether a vehicle is idling concerns the usage of a sensor that connects to the vehicle's engine to be able to tell whether the engine is on or off. If the engine is on then the internal timing mentioned above tracks how long the vehicle has been stationary and provide the applicable alerts to prevent idling violations. If the engine has been shut off, this signals that the vehicle is in park mode. One issue with this method is that a vehicle could be stopped at a red light. To resolve this issue, the system tracks the timing of the vehicles stationary status, speed and location. If the user is in stationary mode for more than one minute, then the system automatically starts to track the time in the event there is a potential idling violation. Since the system integrates a road map in the database, if the vehicle is on a road, the system also recognizes this through the geo-location GPS coordinates to identify the users' location since different jurisdictions may have different idling rules. For example, in NYC a vehicle other than an authorized emergency vehicle, that is parked with its engine running for more than three minutes, or parked next to a school with its engine running more than one minute, is committing an idling violation, whereas under New York State law, vehicles may not idle for more than 5 consecutive minutes.

The application is not limited to the alerts described above. Other functions of the application relating to alerts includes but is not limited to bus lane and any other potential traffic violations, etc. The bus lane is a travel lane restricted to buses only during certain hours of the day. During this time, other vehicles may enter a bus lane only to make the next available right turn, or to quickly drop off or pick up passengers. Violating a bus lane rules results in a $115-$150 fine. NYC enforces bus lanes in two ways through bus lane cameras and police enforcement. The city has installed cameras along bus lanes to catch violators. The signs are posted along routes that have bus lane cameras as an extra warning for drivers to keep out of bus lanes, except for allowed right turns and passenger pick-ups and drop offs. The police enforcement or NYPD regularly patrols bus lanes, and issues moving violations to bus lane violators. To help the users avoid bus lane violations, the system may inform the users is advance when they are approaching bus lane. The bus lanes are identified on electronic maps through colors. For example, the bus lane sign says that entering the lane is prohibited between 7 AM and 7 PM. In that case, the system marks the bus lane area in red color to inform the user that entering is prohibited. The bus lane information is obtained from government websites and updated through traffic citations, the user reports or employees of the system.

Most RRLC states that a bike is considered a type of vehicle. Cyclists have all the rights and are subject to all of the duties and regulations applicable to drivers of motor vehicles. Therefore, this system and method is applicable to the users who travel by bicycle and motorcycle. The bicyclists are subject to traffic violations and may receive tickets based on these violations. If the user indicates in their profile settings that they are riding a bike, the application is able to send the user notifications, alerting the user to areas where you must use the bike lane, stop at the stop sign, ride on the street, not on the sidewalk, use a white headlight and a red taillight, etc. The system may also be used as a reference for applicable bicycle rules for a specific jurisdiction. Additionally, the system and method is applicable to the users when they are traveling without vehicles; as a pedestrian. Pedestrians are subject to traffic regulations and shall be subject to traffic-control signs. The users receive alerts for locations with pedestrian related traffic violations, for example, pedestrian jaywalking tickets.

Exemplary embodiments of the present invention can be integrated with in-dash systems to enable the system to fully function within a vehicle. This integration is not limited to in-dash systems and may also be integrated in the vehicle by original equipment manufacture or third-party add-on equipment that is mounted within a vehicle. Exemplary embodiments for direct integration of the disclosed traffic violation avoidance information system into the navigation and GPS System in an onboard computer of original equipment manufactured vehicles. In such embodiments the disclosed architecture is integrated directly into a vehicle's computer system.

When integrated into an in-dash navigation system, the vehicle's display is used to show traffic alerts in accordance with exemplary embodiments of the present invention as described above. The in-dash integrated system embodiment provides remote updates and communications to the user through the installed disclosed violation related information and traffic violation avoidance application on the user's mobile device to alert the user.

The integration includes utilization of vehicle equipment, for example speedometer, accelerometer, cameras, GPS sensor, and any other applicable equipment, etc. The utilization of this vehicle equipment is used to obtain comprehensive real-time and historical activity information about the vehicle, for example its direction, speed, orientation and acceleration, etc. in order to issue applicable alerts to the users.

Exemplary embodiments of the present invention are used by members of the general public and/or computer systems which include but are not limited to: professionals, civilians, vehicles, websites, robots, in-vehicle systems, Global Positioning Satellites (GPS), and/or other systems. It is also intended that exemplary embodiments of the present invention are used not only within a mobile device application of a mobile device, which may include primarily of smartphones, tablet computers, laptop computers, in-dash vehicle systems, etc., but is also enlarged to encompass other systems or services which may process, utilize, and display the traffic violation-related data, for example, exemplary embodiments of the present invention may contribute to the field of information services for online mapping companies and global positioning system (GPS) manufacturers, smart phone/mobile device manufacturers, wireless service providers, mobile application creators and developers, and mobile operating system developers and distributors, automated vehicle systems that do not require a physical driver in the vehicle etc.

Figure 8:
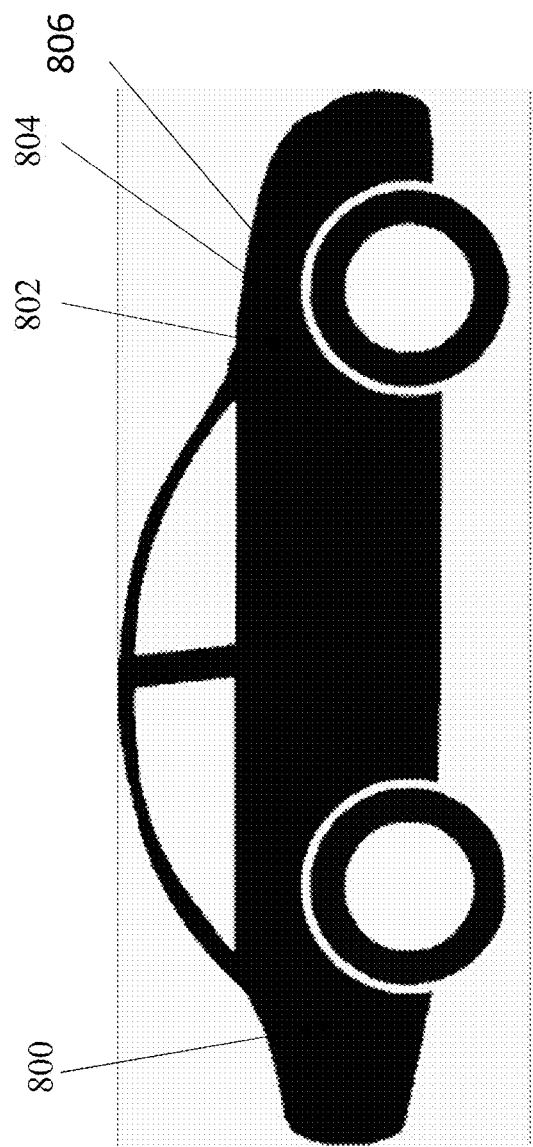
FIG. 8 depicts an example of a transportation vehicle according to the present invention.
Figure 10:
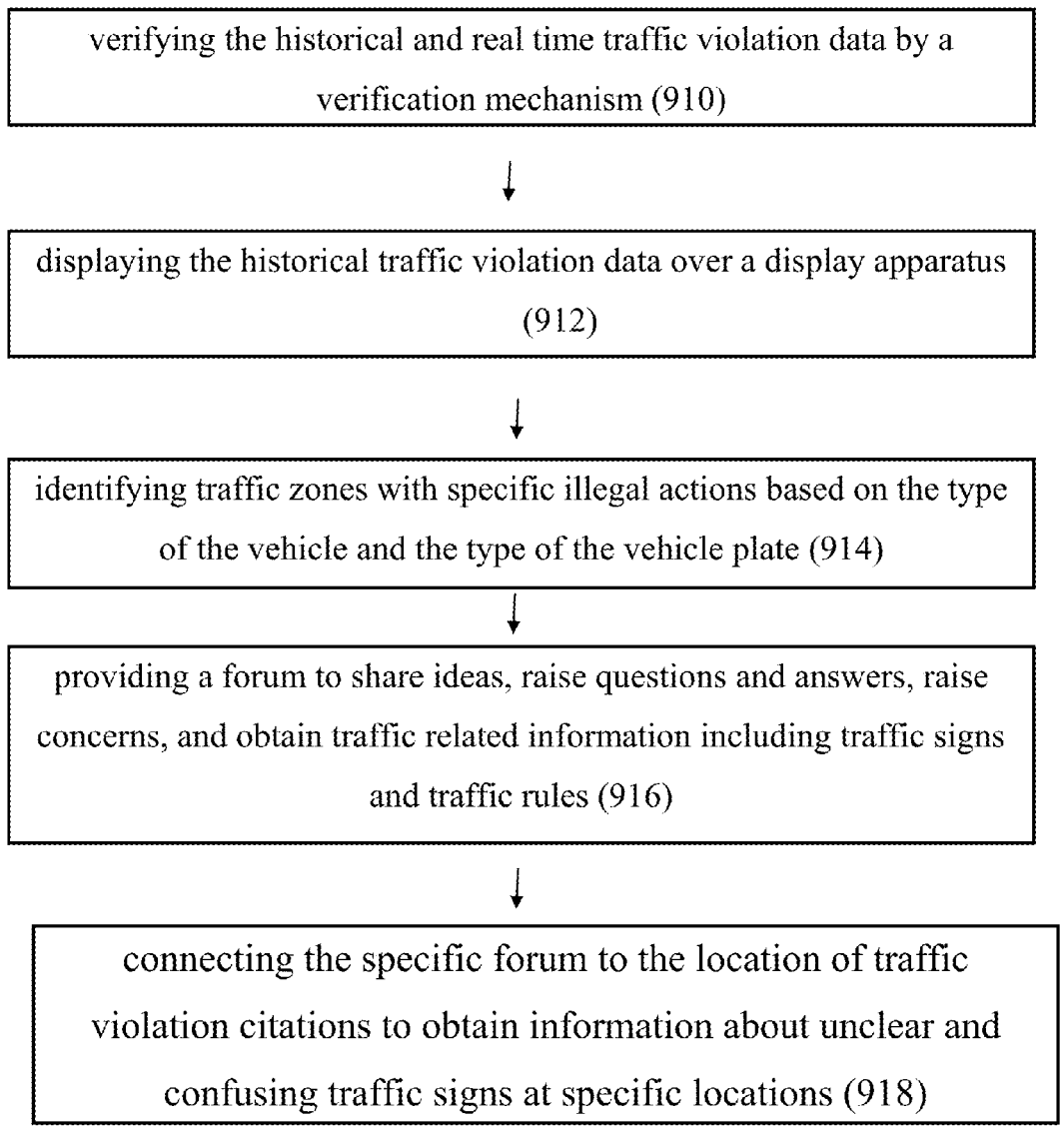
Figure 11:
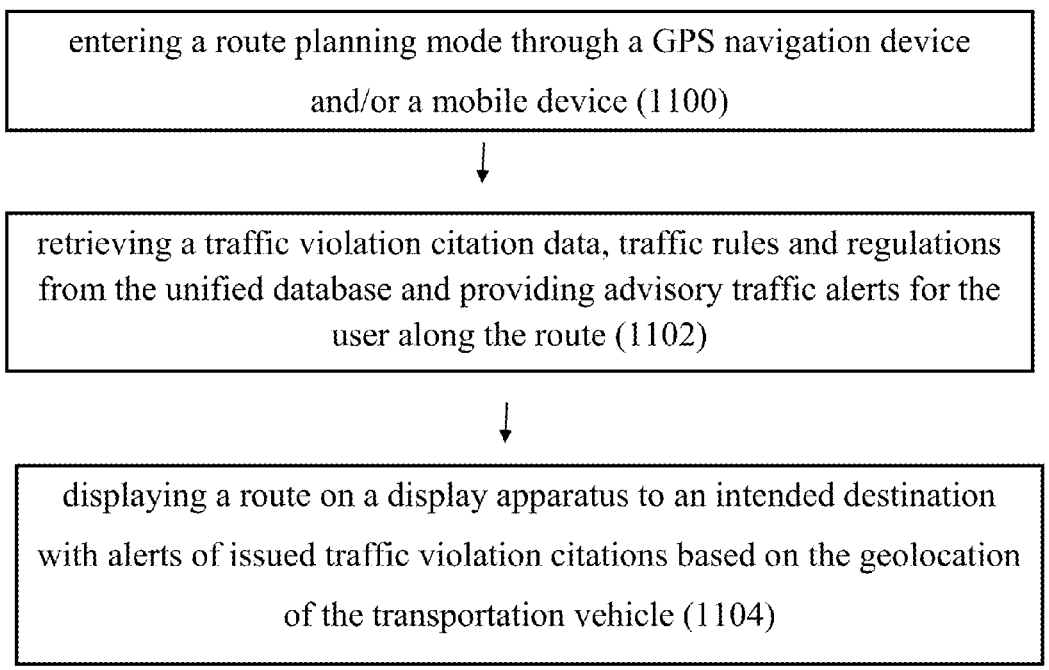
Figure 13:
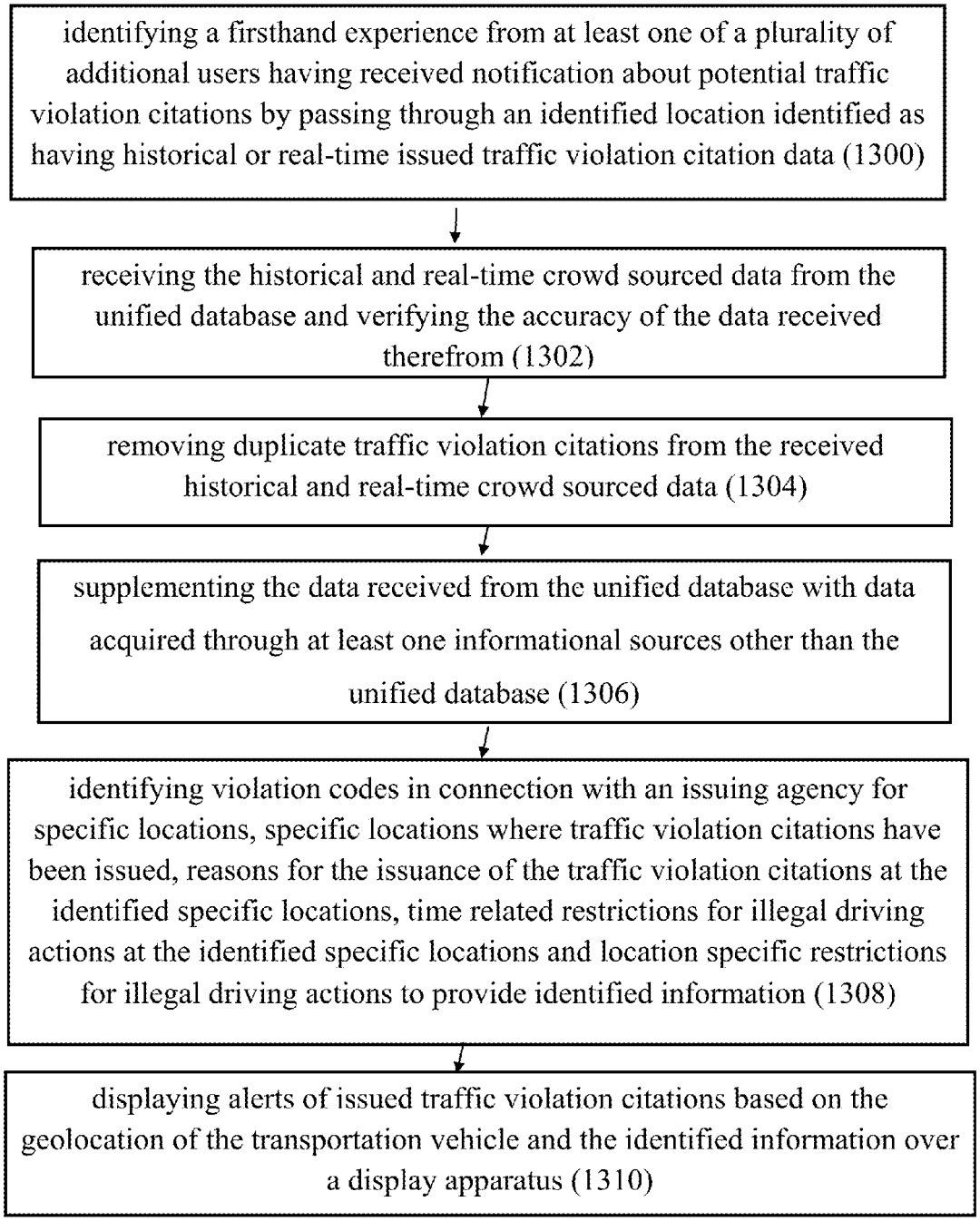

As shown in FIGS. 1-7, a system for aggregating information between a computing system (100) and at least one mobile platform (106) is depicted which provides notification of a potential traffic violation alert in a geographic area, the system comprising: a computing system (100) including a unified database (102) residing in a central server and containing a plurality of traffic related data records (104) for at least one transportation vehicle (108) or at least one pedestrian, wherein the traffic related data records (104) include at least historical traffic violation citations with traffic violation location information. The traffic related data records may include real-time traffic violation citations. The traffic related data records from the traffic violation citations may contain the following fields, by way of example, first name, last name, address, license state, registration expiration, time of violation, date of violation, law violated, description of vehicle, mph, mph zone, US Dot #, Place of occurrence, City of occurrence, county of occurrence, officers last name, officers badge number, police code, police agency, highway number, highway type, bus lane, haz mat violation, commercial vehicle. The mobile platform (106) may be in communication with a location identifier (302) which provides location data. A location identifier (302) may be hardware residence on a mobile phone or in the on board computer of a vehicle. The mobile platform (106) is in communication with the computing system (100) and further in communication with an accelerometer (802), in a vehicle for example, which provides acceleration data, wherein the at least one mobile platform provides at least one notification of a potential traffic violation alert geographic area according to the traffic related data records, location data and acceleration data. As can be seen in FIG. 8, the accelerometer (802) may be factory installed in a transportation vehicle. The example shown is a car, but the transportation vehicle may also be a commercial vehicle, non-commercial vehicle, bicycle and motorcycle. The at least one mobile platform may be a mobile device and the location identifier (308) and the accelerometer (310) may be installed in the mobile device and in wireless communication with the unified database (102). The unified database (102) residing in a central server may further contains at least one of traffic rules, temporary traffic notices, violation codes, and traffic signs for commercial and non-commercial vehicles, pedestrians, bicyclists and motorcyclists and the at least one notification of a potential traffic violation alert geographic area according to the traffic related data records, location data and acceleration data is further according to at least one of the traffic rules, temporary traffic notices, violation codes, and traffic signs for commercial and non-commercial vehicles, pedestrians, bicyclists and motorcyclists. The unified database residing in a central server and containing a plurality of traffic related data records may be populated by: receiving the historical records from at least one information source; receiving the real-time crowdsourced records from a plurality of users; verifying accuracy of the historical records and the real-time crowd-sourced records; and removing duplicate traffic violation citations from the historical records and the real-time crowd sourced records. The term central server may include a network of servers, many servers and/or a cluster of hundred or even thousands of servers.

Figure 4:
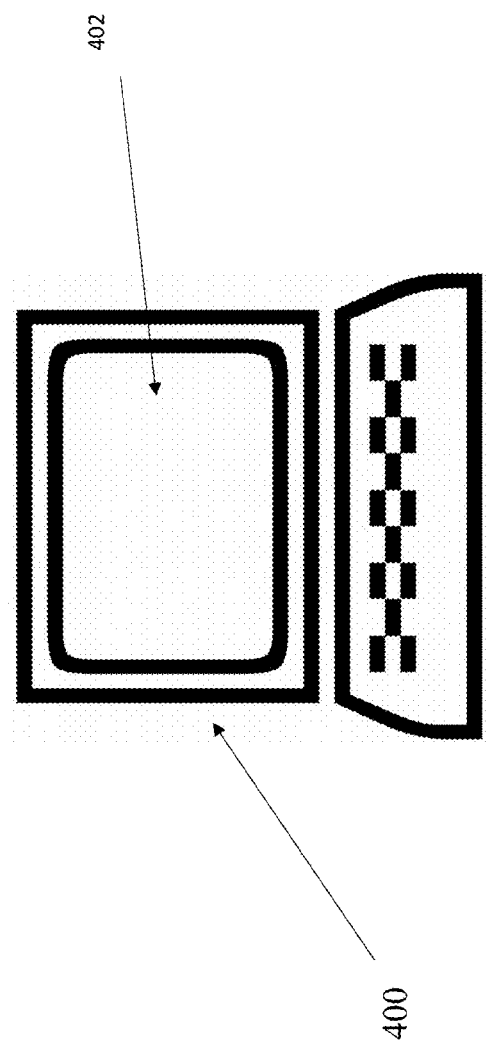
FIG. 4 depicts a computing device according to the present invention.
Figure 5:
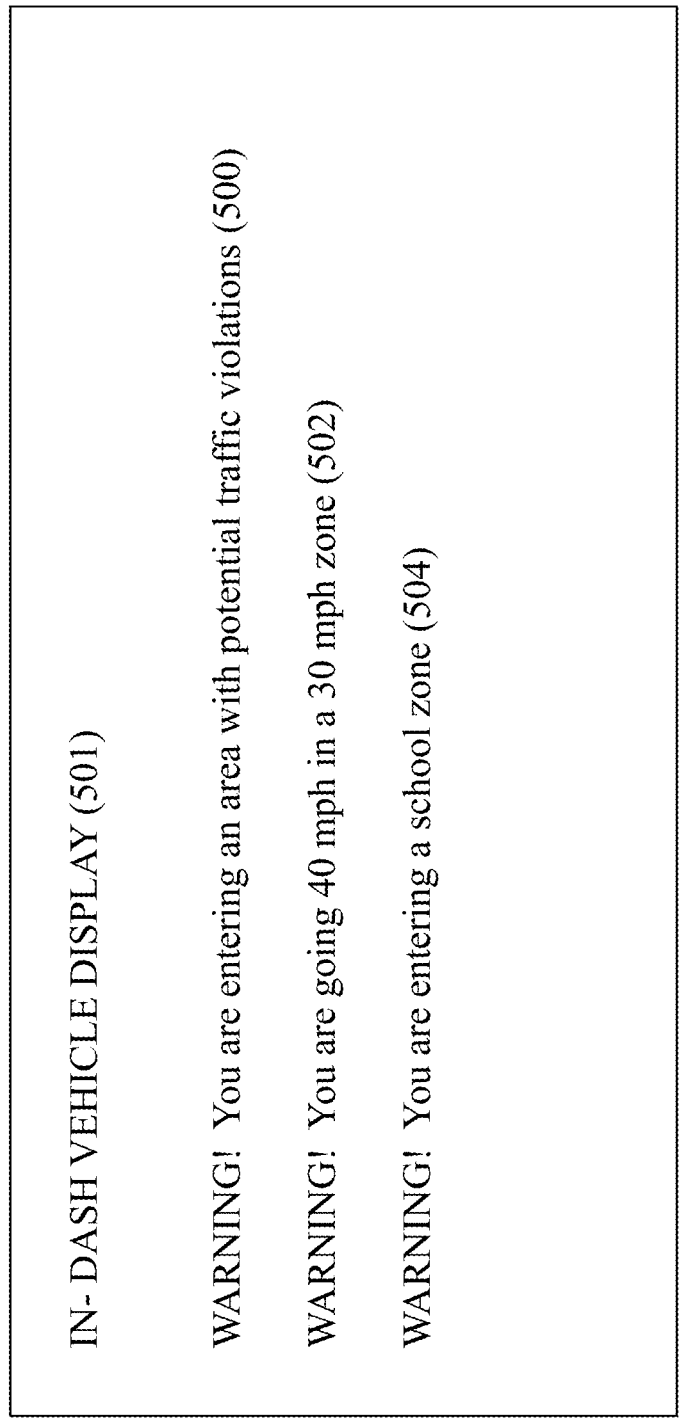
FIG. 5 depicts an in-dash vehicle display according to the present invention.

The mobile platform (300) may have a display apparatus (304) and display at least one notification on the display apparatus. FIG. 4, depicts an example of a computing device (400) and may have a display (402). FIG. 5 displays notifications on an in-vehicle display, for example traffic violation alerts may be displayed on a display apparatus. This in-vehicle display and a mobile phone display would be similar and interchangeable for the purposes of this invention. The notifications may be displayed on one or both. As is well known, users are not to use mobile devices while driving, but it may be useful to have a passenger getting notifications and the in-dash display. In this way, a passenger can assist the driver to avoid potential traffic violations. The mobile platform (300) may be in communication with an in-dash vehicle display (501, 600) and provides at least one notification of a potential traffic violation alert geographic area (606) on the in-dash vehicle display. This may be, for example, over the internet (100). It should be understood that there may be many forms of communication and technology may evolve to change the forms of communication without departing from the present invention. The display apparatus associated with the mobile platform may display a comparison of traffic rules for different countries, states, cities, or municipalities, wherein the comparison is based on a current location of the transportation vehicle or other identified location information input into the mobile platform and a location obtained from a user's driver license stored in a user profile, wherein information obtained from the user's driver license indicates a country, state and city of issuance of the user's driver license; the stored traffic rules are summarized, compared and analyzed to notify the user about differences between traffic rules of the country, state, and city mentioned in the user's driver license and the determined location of the transportation vehicle; and the differences between the traffic rules may be displayed on one or more display apparatus.

The mobile device may have an internal clock mechanism (306) to identify a current time and date, the traffic related data records (104) further including at least historical traffic violation citations with time and date information and the at least one notification of a potential traffic violation alert (e.g. 500, 502 and, 504) is further according to the current time and date and the historical traffic violation citations with time and date information.

The at least one mobile platform may be an in vehicle system, the location identifier is an in vehicle Global Positioning System (GPS) navigation device (804) and the accelerometer (802) is an in vehicle system and the at least one mobile platform, location identifier and accelerometer are in wired communication. By way of example, each of these elements may be in the on-board computer of a vehicle. The vehicle (800) may also have speed sensor (806) for determining the speed of the transportation vehicle, wherein the location identifier and the speed sensor is used to identify location and speed of the transportation vehicle and alert the user during driving in a predefined radius of locations with speed limitations, wherein the locations with speed limitations are identified through different indicators. Typically the vehicle (800) would have the Global Positioning System (GPS) navigation device (804), accelerometer (802), speed sensor (806) factory installed. However, this is not required. For example, navigation devices (804) may be free standing add-on devices without departing from the present invention.

The plurality of historical traffic violation citations comprises geolocations, reasons, time and date of an issuance of traffic violation citations, red light cameras, speed camera locations, bus lane locations, bus lane cameras and applicable penalty information. The traffic related data records may include crowd sourced traffic violation citation data records.

The at least one mobile platform (e.g. 300) may cross-correlates an identified current location of the transportation vehicle (e.g. vehicle 800) with a time and a location of the historical traffic violation citations and traffic rules to predict a likelihood of receiving a traffic violation citation at the identified current location of the transportation vehicle with a time. The plurality of traffic related data records in the unified database may also be divided into non-commercial vehicle and commercial vehicle categories, and further divided into different categories by the type of vehicle plate or type of vehicle and the at least one notification of a potential traffic violation alert further provides detailed reasons of violations applicable to a same type of vehicle plate or a same type of vehicle during the transportation vehicles approach to an intended location associated with at least one historical traffic violation citations or traffic rule.

The at least one mobile platform (e.g. 106) may further transmits traffic information over a display apparatus, wherein the traffic information comprises a plurality of traffic rules and regulations, the historical traffic violation citation locations from the unified database for current location of the transportation vehicle, wherein the unified database comprises information about the locations with potential traffic violation alert, a type of vehicle, a type of vehicle plate, and a fee associated with traffic violation citation. The computing system (204) may further comprise a microprocessor (200); and a server readable program storage medium (202), wherein the program storage medium (202) is non-transitory and tangible in nature, wherein the program storage medium (202) embodies a program of instructions executable by the microprocessor (200) to search and update the traffic related data records in a geolocation and provide at least one notification of a potential traffic violation alert geographic are to assist in avoiding traffic violations.

Traffic violation alerts are displayed on a display apparatus (e.g. 304). Traffic zones with a history of issued traffic violation citations are determined to provide issued traffic violation citation zones and wherein the issued traffic violation citation zones are identified on a display apparatus with at least one indicator. The system may accepts from a user an predetermined distance, or time, in advance of the potential traffic violation alert geographic area for the notification to be issued. For example, the user may input into the mobile platform that they want notifications 30 seconds in advance of the potential traffic violation alert, or 3 blocks. The system may also accept from a user an override of a notification according to at least one of a location, geolocation, time, bus lane violation, school zone violation or any potential notification. For example, the user may travel the same route every date and be very aware that they are entering a bus lane, or a school zone and find it bothersome to be told everyday the same alert. In this case, they can enter an override, indicating they do not wish for the alerts relating to a specific location, geolocation, time, bus lane violation, school zone violation or any potential notification. The historical traffic violation citation information is historical and real-time traffic citation data from the unified database may be used to obtain the lowest allowable speed limit for commercial or non-commercial vehicles at specific locations by analyzing historical and real-time speed traffic violations. A modifier may be accepted from a user in the mobile platform, wherein the modifier is an amount below the lowest allowable speed limit that an alert is sent to the mobile platform. Similarly, the historical traffic violation citation information is historical and real-time traffic citation data from the unified database may be used to obtain: the highest allowable speed limit for commercial or non-commercial vehicles at specific locations by analyzing historical and real-time speed traffic violations. A modifier may be accepted from a user in the mobile platform, wherein the modifier is an amount above the highest allowable speed limit that an alert is sent to the mobile platform. In this way, the alert may be customized. Users can select how far in advance they want to receive notifications. While users may preset and adjust the particular distance where notifications may be sent to the user before arriving at a location with potential traffic violations, the function is also applicable to presetting and adjusting the particular time where notifications may be sent. Users may select a pre-determined amount of time in advance for a notification to be sent before the user arrives at the location with potential traffic violations. The time may be calculated using both speed and distance to the location. The system may track the current location of the user through the GPS capability in the mobile computing device and ascertain the distance from the point of the current location to the location of the potential violation. The system may also calculate the speed of the vehicle in motion through the accelerometer and GPS capability of the mobile computing device. The speed and the distance may then be used to calculate the time it will take the vehicle to arrive at the location with the potential violations. Once the time is calculated, the user will be notified when the time matches the preset time the user has indicated in which the user would like to receive a notification before arriving at the location with potential violations. Additionally, this time calculation may be dynamic and change according to the relative speed of the vehicle, which may be subject to change while the user is driving.

Another aspect of the present invention is that the mobile platform may be voice activated. This may be important to avoid violating laws, for example, using a mobile device while driving. Typically the mobile platform would be activated by the user pressing an application on a mobile device or the on board computer. But, it is also envisioned the application may be launched by a voice activated command.

Figure 6:
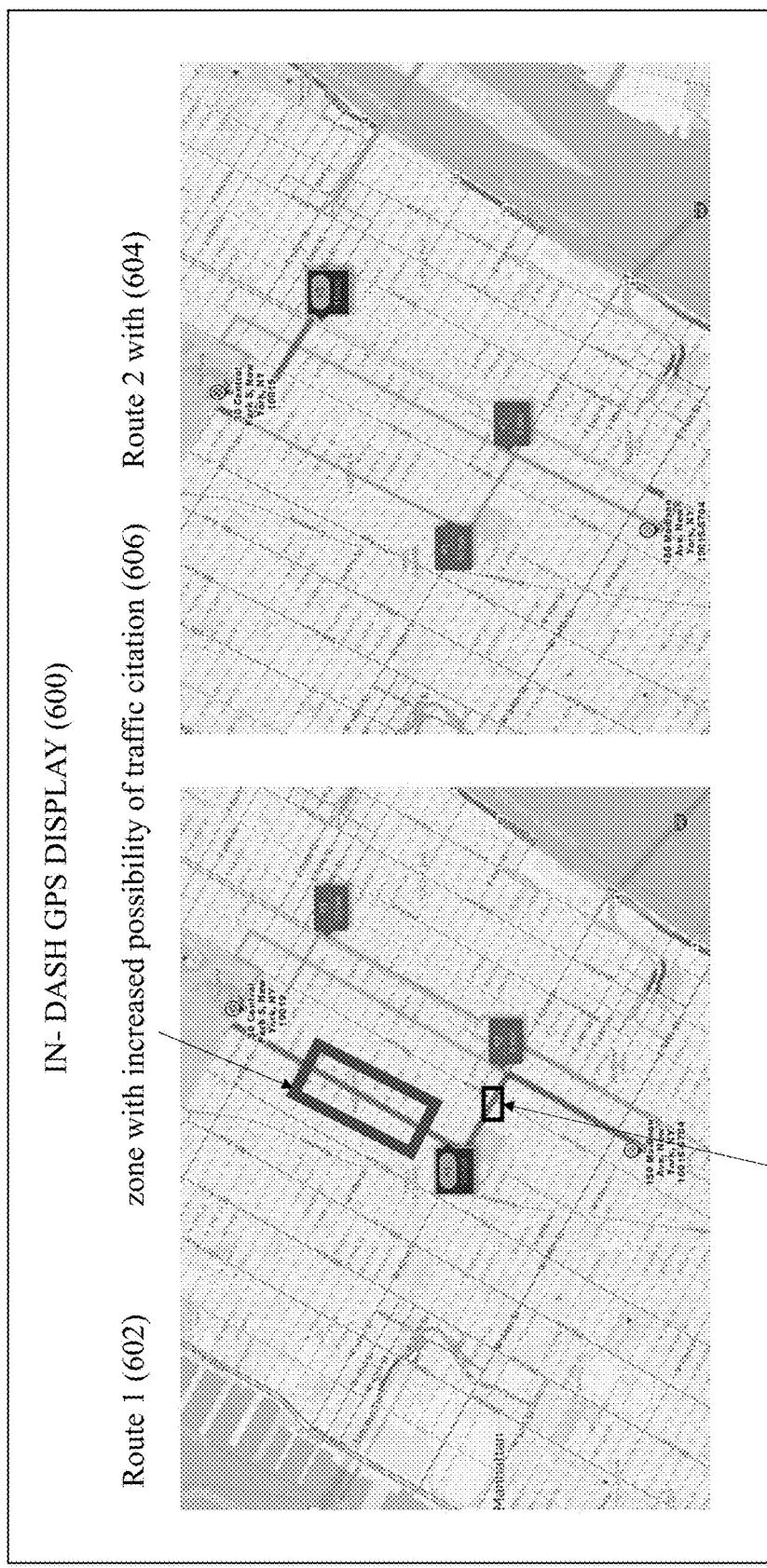
FIG. 6 depicts an in-dash GPS display according to the present invention.

The at least one mobile platform (e.g. 106) may have a forum (700). The forum (700) may contain a general forum for general information on ways to avoid traffic violations not connected to a specific location, and a specific forum connected to specific locations where traffic violations have occurred. The general forum may include a general discussion area for allowing the share and exchange of information and ideas about the traffic violation citations and avoidance thereof; and the general forum may be connected to the specific forum. The forum (700) allows a plurality of users to exchange information and share ideas about traffic violation citations and avoidance thereof. For example, as shown in FIG. 7, the FORUM (700) provides comments on the geographic area you are in or entering (702), such as USERID202—Avoid $34^{th}$ St. bus lane violations (Bus only! 7 am-10 am, 4 pm-7 pm, Mon-Fri) (704), USERID204—'No turn left' to the $8^{th}$ Ave from $34^{th}$ ST ($8^{th}$ Ave is one way road) (706) and USERID206—Accidents happened at this $34^{th}$ ST and $8^{th}$ Ave intersection before (708). The specific forum connects to specific locations and is configured to: organize content according to specific locations of the traffic violation citations; organize content to provide explanations of traffic signs; obtain suggestions to clarify the meanings of the traffic signs along with a rating corresponding to each suggestion, wherein the suggestions with top rating appear on top or the bottom of a list; gather questions, answers and comments about the traffic violations for the specific locations; organize content to clarify reasons for receipt of traffic violation citations; provide recommendations, share ideas, photos, videos, and provide comments to avoid traffic violation citations; organize content to provide plain explanations and multiple language translations of confusing traffic signs and obtain suggestions/redesigns of the confusing traffic signs to clarify their meanings; and provide a street view function with photos, comments, or videos for locations with patterns of traffic violations. The traffic violation alerts may be determined by combining a traffic advisory with a route plan: the GPS navigation device or a mobile device enters a route planning mode through the input of an intended destination from a user; traffic violation citation data, traffic rules and regulations are retrieved from the unified database and advisory traffic alerts for potential traffic violation alerts are sent to the user along the route; and a route is provided to the GPS navigation device or mobile device to the intended destination with alerts of issued traffic violation citations based on the geolocation of the transportation vehicle. An example is depicted in FIG. 6. A first route from 150 Madison Avenue to 30 Central park South is shown as Route 1 (602) having a zone with increased possibility of traffic citation (606). Because of this, an alternate route, Route 2 (604) is provided that avoids the zone with the increased possibility of traffic citation.

The present invention also provides school zone mapping wherein a predefined radius of distance from speed cameras (608) is indicated as a school zone. For example, it may be known that a speed camera (608) is located at $5^{th}$ avenue and 42nds street. The system may designate four blocks as the radius to be a school zone. The speed camera (608) operates within a certain amount of time period before and after school is in session (For example, 7 am to 10 am in the morning and 2 pm to 4 pm in the evening). The applicable speed limit (for example 20 mph) for the school zone is stored in the unified database. A vehicle whose geo-location indicates the vehicle is at any point within the predefined radius of distance of the school zone will receive notification when the speed of the vehicle reaches a certain threshold that may be determined to be a potential traffic violation alert; and a vehicle whose geo-location indicates the vehicle is within a certain distance before the predefined radius of the school zone will receive notifications when the speed of the vehicle reaches a certain threshold that may be a potential traffic violation. School zones may be subject to at least one installed speed camera up to a predefined radius of distance from the entrance or exit of a school building indicated as a school zone; the speed camera may operate within a certain amount of time period before and after school is in session; the certain amount of time period before and after school is in session may be adjusted to compensate for after school events activities; the applicable speed limit may be stored in the unified database; a vehicle with a geolocation that indicates the vehicle is at any point within the predefined radius of distance of the school zone will receive notification when the speed of the vehicle reaches a certain threshold that may be a potential traffic violation; and a vehicle with a geolocation that indicates the vehicle is within a certain distance before the predefined radius of the school zone will receive notifications when the speed of the vehicle reaches a certain threshold that may be a potential traffic violation.

The GPS may be used to help identify firsthand experience wherein firsthand experience is a personal experience of the users whose geolocation history reflect they passed by locations with violations, or have knowledge of the traffic violation location within a certain radius of the traffic violation location wherein the firsthand experience may be verified. In this manner, the system can verify that "firsthand experience" information is verified. For example, the user may say, there is a cop pulling people over at $42^{nd}$ and Fifth Avenue, the GPS may be queried to verify they were at (or within a certain radius of) that location. If they were, the "firsthand experience is verified. The present invention provides methods for mapping historical traffic violation citation information and aggregating data related to the historical traffic violation citation between a computing system and at least one mobile platform and providing notification of a potential traffic violation alert in a geographic area, the method comprising the steps of: storing a plurality of the traffic related information including at least one of bus lane cameras, bus lane locations, speed cameras locations, school zone locations and traffic light cameras (900); receiving a geocoded location through a location identifier (902); inferring traffic ticket specific information (904); using an internal clock mechanism to identify current time and date (908); searching and analyzing historical and real time traffic violation data, stored in a unified database of a computing system, based on a type of vehicle and a type of vehicle plate in a specific geocoded location, wherein the searching is performed in the unified database through a microprocessor stored in a server (906); verifying the historical and real time traffic violation data by a verification mechanism (910); displaying the historical traffic violation data over a display apparatus (912); identifying traffic zones with specific illegal actions based on the type of the vehicle and the type of the vehicle plate (914); and providing a forum to share ideas, raise questions and answers, raise concerns, and obtain traffic related information including traffic signs and traffic rules (916). There may be the step of connecting the specific forum to the location of traffic violation citations to obtain information about unclear and confusing traffic signs at specific locations (918).

Traffic zones with a history of issued traffic violation citations are determined to provide issued traffic violation citation zones and the issued traffic violation citation zones are identified on a display apparatus with at least one indicator. The indicator may be a color on a map, a flashing symbol, a voice notification, a text notification, or any other manner in which an area may be indicated on a display device. The indicator may be based on the type of the vehicle and type of the vehicle plate. Different formats for the issued traffic violation citation zones may be displayed on an electronic map with location data through the display apparatus. The issued traffic violation citation zone indicators may be displayed dynamically. Different indicators may be used to identify, for example: (1) increased possibility of getting a traffic citation based on type of transportation vehicle and type of plate of the transportation vehicle; (2) density of issued traffic violation citations at specific locations for a specific type of transportation vehicle and type of plate of the transportation vehicle, wherein the density comprises a plurality of locations with higher number of issued traffic citations differentiated by different indicators including at least one of different colors and different shapes; (3) density of issued traffic violation citations for broad geographic areas and narrow geographic areas; (4) illegality of specific traffic actions within specific time frames; and (5) fluctuations in number of issued traffic violation citations reflected at specific locations based on a time and a date and historical traffic violation data for said location at the time of the day. The disclosed embodiment incorporates systems and methods to alert users about locations prone to violations by using different indicators that may include but are not limited to colors, shapes, formats or any other distinctive indicators to help the user identify potential violations while planning their route. Such locations are displayed on the display of the user through different indicators and may be applicable to certain points, streets or entire blocks. This feature is very useful for route planning, as it may help the users to avoid traffic violations by choosing alternative routes with no or lesser amount of ticket violations. Indicators may be changed dynamically, depending on the time of the day and day of the week according to the amount of issued traffic violations for the specific timeframe the user is planning his/her trip.

The unified database may store a plurality of traffic rules, violation codes, historical traffic violation citations and real-time crowd-sourced traffic violation citations for commercial and non-commercial, pedestrians, bicyclists and motorcyclists, and other traffic related information, a plurality of issued traffic violation citations including geolocations, reasons and time and date of the issued traffic violation citations. An identified current location of a user may be cross-correlated with a time and a location of each of the issued traffic violation citations to predict a likelihood of receiving a traffic violation citation at the user's identified current location, time and date, wherein the at least one mobile platform further transmits traffic information over a display apparatus, wherein the traffic information comprises a plurality of traffic rules and regulations, locations with issued traffic violation citations availed from the unified database for current location of the transportation vehicle and traffic violation citation locations availed from the unified database for a location requested in the at least one mobile platform, wherein the traffic information further comprises a type of plate, a type of vehicle, and specific location of the issued traffic violation citation.

The method may further comprise the steps of providing traffic violation alerts by combining a traffic advisory with a route planning by performing the steps of: entering a route planning mode through a GPS navigation device and a mobile device (1100); retrieving a traffic violation citation data, traffic rules and regulations from the unified database and providing advisory traffic alerts for the user along the route (1102) and displaying a route on a display apparatus to an intended destination with alerts of issued traffic violation citations based on the geolocation of the transportation vehicle (1104).

The microprocessor stored in the central server may performs the following steps to analyze and cluster the data: receiving geolocation, date, time and violation codes, for each of the issued traffic violation citations for both commercial and non-commercial vehicles from the unified database (1200); receiving traffic rules for both commercial and non-commercial vehicles from the unified database (1202); deciphering violation codes for both commercial and non-commercial vehicles from the unified database and correlating the deciphered violation codes to the traffic rules and regulations from the unified database (1204); and clustering data based on reasons, the geocoded location, time, date, type of vehicle, and type of vehicle plate for each of the issued traffic violation citations (1206).

There may be the steps of identifying a firsthand experience from at least one of a plurality of additional users having received notification about potential traffic violation citations by passing through an identified location identified as having historical or real-time issued traffic violation citation data (1300); or receiving the historical and real-time crowd sourced data from the unified database and verifying the accuracy of the data received therefrom (1302); removing duplicate traffic violation citations from the received historical and real-time crowd sourced data (1304); and supplementing the data received from the unified database with data acquired through at least one informational sources other than the unified database (1306). There may be the steps of identifying violation codes in connection with an issuing agency for specific locations, specific locations where traffic violation citations have been issued, reasons for the issuance of the traffic violation citations at the identified specific locations, time related restrictions for illegal driving actions at the identified specific locations and location specific restrictions for illegal driving actions to provide identified information (1308); and displaying alerts of issued traffic violation citations based on the geolocation of the transportation vehicle and the identified information over a display apparatus (1310). The historical traffic violation citation may be provided by photographs or scans of received traffic violation citations. An optical character recognition may be performed prior to providing the photographs or scans of the received traffic violation citations. The historical traffic violation citations may be input either manually or through interpreted vocal instructions into the unified database. The historical traffic violation citations may be input into the unified database, where updating and sharing leads to a monetary reward, credited to a user account on following actions: at least one historical traffic violation citations data that is new for a specific location and not available through the unified database is shared and uploaded; at least one traffic violation citation that is new for a specific location is shared and uploaded with reasons for the traffic violation citations and recommendations are provided to avoid the violation citations; positive ratings received for provided recommendations from at least one user with firsthand experience; displaying the relevant data to alert a user and receiving a recommendation on how to avoid a traffic violation citation at a received geocoded location, wherein recommendations can be rated either positively or negatively and providing the positive endorsements or ratings of the recommendation to avoid traffic violation citations by the one or more other users with firsthand experience; wherein an amount of the monetary reward is equal to a total fine amount stated on a traffic violation citation, and the monetary reward is provided on reaching a predetermined number of positive endorsements or ratings.

There may be the steps of mapping and storing information in the unified database and alerting a user of certain time sensitive information related to violation locations. There may also be the steps of identifying geolocation of the transportation vehicle by a location identifier; identifying current time by an internal clock mechanism; inferring a time sensitive data related to certain violation locations from the unified database; processing the bus lane data; displaying a bus lane zone on electronic maps in colors according to restrictions associated with the time of the day; and updating the unified database through historical bus lane citations, user reports and employees of the system. There may be the steps of identifying idling of the transportation vehicle by; Identifying geolocation of the transportation vehicle by a location identifier (1400); Identifying stationary mode of the vehicle by an accelerometer (1402); Identifying a time that the vehicle has been in stationary mode by an internal clock mechanism (1404), wherein the internal clock mechanism starts tracking the time from beginning of the vehicle being in stationary mode; Determining idling rules from the unified database according to the type of vehicle, location and time (1408); displaying a warning on a display apparatus prior to committing an idling violation (1410); and display of the penalties associated with idling violations (1412). The idling rules may be inferred from the unified database according to the type of vehicle, location and time. Inferring idling rules: If a ticket is uploaded to the system with the violation cited as an idling violation. The system may use the location on the ticket to infer a certain location, such as a block or street contains idling restrictions. Furthermore, in NYC for example, an idling violation is defined as having a vehicle's engine running while the vehicle is stationary for a period of three consecutive minutes. Once a idling ticket is reported for the location, the system can infer that the location stated on the ticket is a location that does not allow idling. Therefore, any vehicle who stops in that location for a period of time that is approaching 3 minutes (as calculated by the geolocation and a time mechanism), may be sent a notification from the system alerting the user to the possibility that the location is subject to an idling violation if the user continues to stay at that location. The system may further verify whether there is duplicate data. This may be done by sorting the data based on various criteria. The data can be sorted by geolocations (A to Z or Z to A), numbers (smallest to largest or largest to smallest), and dates and times (oldest to newest and newest to oldest) in one or more columns. It can also be sorted by custom list, such as type of the violations. Most sort operations are column sorts, but they can also be sorted by rows. Sort criteria are saved with the worksheet of the database so that the system can re-apply the sort each time when new data is entered into database. If the tickets issued on dates and times that match those are already in the database, this data is labeled as duplicate data and rejected by the system. However, the tickets issued on dates and times not included in the database are added to the historical database and notifications are updated to properly reflect added data to properly alert the users with updated information. The following may be one set of verification steps: 1) Identify data contained in the database by clustering the data according to geolocations, time frames that the tickets were received and violation types; 2) Identify the crowdsourced data; 3) Make sure that the crowdsourced data is accurate and translated into the same unified format that matches historical data contained in the database; 4) The system sorts the historical and crowdsourced data based on geolocations, time, and type of the violation variables; 5) The system identifies if there is any duplicate data; 6) The system rejects duplicate data and duplicate data is not entered into the database of the system; 7) The process is repeated for every new received violation; and 8) The users are notified about new violations in their interest zones. Idling rules are location specific. For example, in NYC no person shall cause or permit the engine of any vehicle, other than a legally authorized emergency motor vehicle, to idle for longer than three (3) minutes while parking, standing or stopping unless the engine is being used to operate a loading, unloading or processing device. In school zones to cut pollution the law does not allow to idle for more than 60 seconds. Exemplary embodiments of the present invention utilize accelerometer, speedometer and the GPS to identify the location of the vehicle and the time that the vehicle has been in the idling state. The system will then generate an advance automatic notification to alert the driver he/she is approaching allowable idling time limits. The driver can then either take actions and shut off the engine or ignore the notifications, if he/she believes does not violate the rules.

Certain routes a transportation vehicle travels on a frequent basis may be recorded, stored, and used to send notifications to the display apparatus when there are potential traffic violations on the certain route before the transportation vehicle travels on the certain route; and wherein notifications are sent to the display apparatus in real-time according to traffic violation reports from the unified database along the certain route the transportation vehicle is traveling on at the instant time.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:

1. A system for providing traffic violation avoidance guidance, the system comprising:
   a computing system;
   a database residing in a central server of the computing system, the database configured to store traffic related data, wherein the traffic related data is categorized into one or more data types, the data types comprising at least one of: commercial vehicle related data, non-commercial vehicle related data, data type based on type of vehicle, data type based on type of vehicle plate, motorcyclist related data, cyclist related data, or pedestrian related data;
   one or more processors in communication with the database, configured to (i) analyze the traffic related data applicable to a user directly or by inference to predict one or more potential traffic violations, and (ii) generate at least one notification of a potential traffic violation;
   one or more non-transitory computer readable program storage media storing instructions to instruct the one or more processors to provide traffic violation avoidance guidance based on at least one user type, the at least one user type comprising at least one of: commercial vehicle user, non-commercial vehicle user, user type based on type of vehicle, user type based on type of vehicle plate, motorcyclist user, cyclist user, or pedestrian user, wherein the traffic related data is categorized based on the at least one user type; and
   a remote computing device in communication with the computing system, the remote computing device configured to display the at least one notification of a potential traffic violation based on the data type corresponding to the user type and an identified location of the user.

2. The system according to claim 1, wherein the traffic related data is received from one or more sources selected from the group comprising: one or more additional users, other interested individuals, government agencies, government websites, non-government organizations, private entities, transportation companies, community organizations, websites containing useful information such as law enforcement abbreviations, media sources, municipalities, municipal drivers, private drivers, employees of said system, third-party contractors of said system, blog posts, social networks, newspapers, magazines, professional articles, publicly available sources, real-time crowd-sourcing, and other resources where traffic violation related data is stored.

3. The system according to claim 1, wherein the traffic related data includes at least one traffic violation citation and at least one of: one or more traffic rules, one or more vehicle traffic rules, one or more motorcycle traffic rules, one or more cycle traffic rules, one or more pedestrian traffic rules, temporary traffic notices, violation codes, or content of traffic signs for commercial vehicles, non-commercial vehicles, motorcyclists, cyclists, and pedestrians.

4. The system according to claim 1, wherein the database is updated by at least one of:
   receiving at least one traffic violation citation from one or more sources;
   receiving real-time crowdsourced records from a plurality of users;
   verifying accuracy of at least one traffic violation citation; or
   removing at least one duplicate traffic violation citation from the database.

5. The system according to claim 4, wherein the database includes a traffic sign database associated with a forum which stores traffic sign locations, images and applicable rules, and wherein the traffic sign database includes information associated with temporary traffic notices applying to certain locations.

6. The system according to claim 1, wherein the traffic related data further includes crowdsourced traffic related data, wherein the crowdsourced traffic related data is obtained by one or more users providing the traffic related data through one or more remote computing devices, and wherein the traffic related data stored in the database is modified with the crowdsourced traffic related data.

7. The system according to claim 1, wherein the database includes traffic signal data associated with details on type, location, timing, or sequence for a plurality of traffic signals in at least one geographic region.

8. The system according to claim 1, wherein the database is configured to store at least one violation code, and wherein the one or more potential traffic violations are inferred by the computing system based at least on the at least one violation code.

9. The system according to claim 1, wherein the remote computing device is an in-vehicle system having a Global Positioning System (GPS) device, wherein the GPS device is used to help identify firsthand experience of one or more additional users with respect to particular traffic violations stored in the database, and wherein the firsthand experience is identified as physically being or having been within a predetermined distance from locations at which the particulars traffic violations occurred.

10. The system according to claim 1, wherein the remote computing device is a mobile computing device in communication with a forum,
   wherein the forum contains at least one of a general forum for general information relating to avoidance of traffic violations not relating to a specific location, or a specific forum connected to specific locations where traffic violations have occurred, and
   wherein the general forum includes a general discussion area enabling an exchange of information about traffic violation citations.

11. The system according to claim 10, wherein the forum includes the specific forum, and wherein the specific forum is configured to at least one of:
   organize content according to specific locations of the traffic violations;
   organize content to provide explanations of traffic signs;
   obtain suggestions to clarify meanings of the traffic signs along with a rating corresponding to each suggestion, wherein the suggestions having a top rating appear on top of a list;
   gather information relating to the traffic violations for specific locations;
   organize content to clarify one or more reasons for receipt of the traffic violations;
   provide responsive information relating to avoidance of the traffic violations;
   organize content to provide at least one of: plain explanations, multiple language translations, or requests for redesign suggestions of confusing traffic signs to clarify their meanings; or
   provide a street view function to enable one or more of: photos, comments, or videos for locations having a predetermined number of traffic violations.

12. The system according to claim 1, wherein the computing system is configured to:
   subject the at least one notification to positive ratings or negative ratings by at least one of a plurality of additional users having firsthand experience, wherein the positive or negative ratings are provided through at least one of a plurality of remote computing devices, and wherein the firsthand experience is identified by the plurality of additional users passing or having passed within a predetermined distance of the geographic area associated with the at least one notification.

13. The system according to claim 12, wherein the computing system is configured to:
   allocate a monetary or non-monetary reward to one of the plurality of additional users having the firsthand experience, based on the notification receiving a predetermined number of the positive ratings.

14. The system according to claim 12, wherein at least part of the traffic relevant data in the database is modified in response to the one or more notifications with the one or more reasons reaching a predetermined number of the ratings or one or more recommendations reaching a predetermined number of the ratings.

15. The system according to claim 14, wherein the one or more processors are further configured to:
   modify the one or more notifications relating to inaccurate relevant information upon the one or more notifications reaching a predetermined number of negative ratings,
   wherein the inaccurate relevant information includes at least one of: a part of the one or more reasons, or a part of the one or more recommendations.

16. The system according to claim 15, wherein one or more of the plurality of additional users submit one or more additional reasons or one or more additional recommendations to replace the inaccurate relevant information,
   wherein at least one of the one or more additional reasons or the one or more additional recommendations is subject to ratings from one or more other of the plurality of additional users, and
   wherein at least one of the one or more additional reasons or the one or more additional recommendations are incorporated into the one or more notifications upon reaching the predetermined number of positive ratings.

17. The system according to claim 1, wherein the at least one notification is further based on at least one of: at least one traffic violation citation, the remote computing device entering a particular geographic area, or a current time and date related to the user.

18. The system according to claim 1, wherein the at least one notification further provides one or more reasons for violations applicable to the user type of the user during the user's approach to an intended location associated with at least one traffic violation citation.

19. The system according to claim 1, wherein the computing system is configured to:
   receive, from the remote computing device, a modifier representative of an amount over a speed limit the user must be travelling in order to receive a particular notification; and
   determine, based on the traffic related data and the modifier, a vehicle speed at a specific location at which to send the particular notification to the remote computing device.

20. The system according to claim 1, wherein the computing system is configured to:
   send a respective notification to the remote computing device informing a driver associated with the remote computing device that a traffic light is about to change.

21. The system according to claim 1, wherein the computing system is configured to:
   send a respective notification to the remote computing device informing a driver associated with the remote computing device that the driver is near a particular red-light camera location.

22. The system according to claim 1, wherein the computing system is configured to receive from the user a predetermined distance from a geographic region associated with a respective notification at which the user desires to receive the respective notification.

23. The system according to claim 1, wherein the computing system is configured to accept from the user an override of at least one respective notification according to at least one of a location, a geolocation, a time, a bus lane violation, a school zone violation, or any respective potential notification.

24. The system according to claim 1, further comprising school zone mapping wherein a region defined by a pre-defined radius from a speed camera is indicated as a school zone,
   wherein the speed camera operates within a certain time period before and after school is in session, and
   wherein an applicable speed limit for the school zone is stored in the database.

25. The system according to claim 1, wherein a transportation vehicle driven by the user whose particular identified location, determined from the remote computing device, indicates the transportation vehicle is at any point within a particular geographic region or school zone, will receive notification when a speed of the vehicle reaches a predetermined threshold.

26. The system according to claim 1, wherein the computing system is configured to:
   transmit at least one respective notification of one or more unpaid pending traffic violations to the user containing information related to the one or more unpaid pending traffic violations; and
   update the database with the information related to the one or more unpaid pending traffic violations.

27. The system according to claim 1, wherein the remote computing device is configured to display traffic violation notifications along a suggested travel route.

28. The system according to claim 1, wherein the computing system is configured to determine the potential traffic violation by combining a traffic advisory with a route plan,
   wherein a global positioning system (GPS) navigation device or the remote computing device is configured to enter a route planning mode through input of an intended destination from the user,
   wherein traffic violation citation data, traffic rules, or traffic regulations are retrieved from the database and advisory traffic alerts are sent to the user along a route, or
   wherein a route is provided to the GPS navigation device or the remote computing device with advisory traffic alerts based on a location of a transportation vehicle driven by the user.

29. The system according to claim 1, wherein the computing system is configured to:
   identify a plurality of specific locations along a route which, for a specific type of vehicle or a specific type of vehicle plate, have at least a predetermined number of issued traffic citations; and
   display, on the remote computing device, a plurality of indicators corresponding to the plurality of specific locations along the route having at least the predetermined number of issued traffic citations.

30. The system according to claim 1, wherein the computing system is configured to:
   identify a fluctuation in a number of issued traffic violation citations at one or more specific locations along a route based on a change in at least one of time or date, and based on the traffic related data stored in the database for the location; and
   display, on the remote computing device, an indicator representative of the fluctuation at the specific location.

31. The system according to claim 1, wherein the computing system is configured to:
   store, in the database, at least one route travelled by a vehicle at least a predetermined number of times;
   determine, based on the traffic related data, at least one potential traffic violation within a geographic region on the at least one route; and
   send a respective notification to a display apparatus of the remote computing device prior to the remote computing device entering the geographic region.

32. The system according to claim 1, wherein the computing system is configured to:
   receive at least one user customizable parameter from the remote computing device;
   identify a plurality of matching route options based on a start location, an end location, and the at least one user customizable parameter; and
   display the plurality of matching route options on the remote computing device along with, for each matching route, information corresponding to the at least one user customizable parameter.

33. The system according to claim 32, wherein the user customizable parameter relates to at least one of: a government restriction for a type of vehicle the user is driving, a government restriction for a type of vehicle plate on a vehicle the user is driving, a bridge, a highway, or a tunnel.

34. The system according to claim 1, wherein the computing system is configured to:
   identify idling of a transportation vehicle driven by the user by identifying one or more of: a location of the transportation vehicle by a location identifier, a stationary mode of the transportation vehicle by an accelerometer, a time the transportation vehicle has been in stationary mode, or a location of the transportation vehicle; and
   determine idling rules from the database according to at least one of: the type of vehicle, the type of vehicle plate, the location, or the time.

35. The system according to claim 34, wherein the computing system is configured to:

display a warning on a display apparatus associated with the remote computing device when the time the transportation vehicle has been in the stationary mode is approaching the time for committing an idling violation at the location.

36. The system according to claim 35, wherein the computing system is configured to:
display on the display apparatus penalties associated with the idling violation.

37. The system according to claim 34, wherein the computing system is configured to:
infer idling rules from the database according to one of: the type of vehicle, the location, the type of vehicle plate, or the time.

38. The system according to claim 1, wherein at least one of the following applies for the data type corresponding to the user type:
the commercial vehicle related data at least corresponds to the commercial vehicle user type;
the non-commercial vehicle related data at least corresponds to the non-commercial vehicle user type;
the data type based on type of vehicle at least corresponds to the user type based on type of vehicle;
the data type based on type of vehicle plate at least corresponds to the user type based on type of vehicle plate;
the motorcyclist related data at least corresponds to the motorcyclist user type;
the cyclist related data at least corresponds to the cyclist user type; or
the pedestrian related data at least corresponds to the pedestrian user type.

39. The system according to claim 1, wherein the remote computing device cross-correlates the identified location and an identified time of the user with a time and a location of at least one traffic violation citation and at least one traffic rule corresponding to the identified location and the identified time to predict a likelihood of receiving a particular traffic violation citation at the identified location at the identified time.

40. The system according to claim 1, wherein a display apparatus associated with the remote computing device displays a comparison of traffic rules for different jurisdictions based on the traffic related data, wherein the comparison is based on a particular identified location of the user and a location identified from the user's driver license stored in a user profile,
wherein the user profile indicates at least one of a country, a state, or a city of issuance of the user's driver license;
wherein the traffic rules are analyzed to inform the user about differences between traffic rules of the location identified from the user's driver license and the identified location of the user; or
wherein the differences between the traffic rules are displayed on the display apparatus.

41. The system according to claim 1, further comprising a speed sensor for determining a speed of a transportation vehicle associated with the user,
wherein a location identifier in conjunction with the speed sensor is used to identify a location of the transportation vehicle,
wherein the remote computing device is configured to alert the user when the user is driving the transportation vehicle within a predefined radius of one or more locations having particular speed limitations, or
wherein the one or more locations with particular speed limitations are represented on a display of the remote computing device having different indicators.

42. The system according to claim 1, wherein traffic zones having a history of issued traffic violation citations are identified as one or more traffic violation citation zones, and represented on a display apparatus of the remote computing device with at least one indicator.

43. The system according to claim 1, wherein the one or more potential traffic violations are inferred by the computing system based on information associated with a vehicle of the user and location data from the remote computing device, and wherein the information includes at least one of: a type of vehicle plate or a type of vehicle.

44. The system according to claim 1, wherein a verification algorithm performs the steps of at least one of:
identifying a firsthand experience from one or more of the plurality of additional users who received a notification about potential traffic violation citations by passing through the location identified to have historical or real-time issued traffic violation citation data;
receiving historical and real-time crowd sourced data from the unified database and verifying the accuracy of the data received therefrom; or
supplementing data received from the database with data acquired through one or more sources different from the database.

45. A system for providing traffic violation avoidance guidance, comprising:
a computing system;
a database residing on a central server connected to the computing system, the database configured to store traffic related data categorized into one or more data types or one or more user types; and
a remote computing device in communication with the computing system, the remote computing device comprising a location identifier which provides location data associated with an identified location of a user,
wherein the computing system is configured to provide a summary of differences between a first plurality of traffic rules associated with the identified location and a second plurality of traffic rules associated with a geographic region from which a driver's license of the user issued, and wherein the summary is based on at least one of the one or more data types or the one or more user types.

46. The system according to claim 45, wherein the remote computing device is configured to display the summary.

47. The system according to claim 45, wherein the identified location and the geographic region are two different countries.

48. The system according to claim 45, wherein the identified location and the geographic region are two different geographic regions within the same country.

49. The system according to claim 45, wherein the computing system is further configured to:
provide a notification, through the remote computing device, relating to a potential traffic violation at the identified location.

50. The system according to claim 45, wherein the one or more user types comprise at least one of: commercial vehicle user, non-commercial vehicle user, motorcyclist user, cyclist user, or pedestrian user.

51. The system according to claim 45, wherein the one or more data types comprise at least one of: commercial vehicle relevant data, non-commercial vehicle relevant data, data based on type of vehicle, data based on type of vehicle plate, motorcyclist relevant data, cyclist relevant data, or pedestrian relevant data.

52. The system according to claim 45, wherein the traffic related data includes at least one traffic violation citation comprising at least traffic violation location information.

53. The system according to claim 45, wherein at least one of the first plurality of traffic rules or the second plurality of traffic rules includes at least one of: a temporary traffic notice, a violation code, or content of traffic signs for commercial vehicles, non-commercial vehicles, motorcyclists, cyclists, or pedestrians.

54. The system according to claim 45, wherein the traffic related data further includes crowdsourced traffic related data, wherein the crowdsourced traffic related data is subject to ratings by one or more additional users, and wherein the database is modified upon the ratings reaching a predetermined number of ratings.

55. The system according to claim 45, wherein the identified location includes at least a location the user is approaching or a predetermined location.

56. A system for providing traffic violation avoidance guidance, comprising:
   a computing system configured for communication with a user and a plurality of additional users through one or more remote computing devices;
   a database, in communication with the computing system, the database configured to store traffic related data;
   a location determining apparatus, in communication with the one or more remote computing devices, to identify a present location of the user;
   one or more non-transitory computer readable program storage media storing instructions to instruct one or more processors, in communication with the computing system, wherein the one or more processors are configured to (i) categorize said traffic related data based on at least one user type of said user, the at least one user type comprising at least one of: commercial vehicle user, non-commercial vehicle user, motorcyclist user, cyclist user, or pedestrian user, (ii) analyze the traffic related data in said database applicable to the user directly or applicable to the user by inference to predict one or more potential traffic violations based on at least the identified present location of the user and the user type of the user, and (iii) generate at least one notification based on the predicted one or more potential traffic violations based on the traffic relevant data;
   a display apparatus, in communication with the computing system, configured to display the at least one notification based on the user type and an identified location of the user.

57. The system according to claim 56, wherein the computing system is configured to:
   subject the at least one notification to positive ratings or negative ratings by at least one of the plurality of additional users having firsthand experience, wherein the positive or negative ratings are provided through at least one of the one or more remote computing devices, and wherein the firsthand experience is identified by the plurality of additional users passing or having passed within a predetermined distance of a geographic area associated with the at least one notification.

58. The system according to claim 56, wherein the computing system is configured to:
   identify idling of a transportation vehicle driven by the user by identifying one or more of: a location of a transportation vehicle by the location identifier, a stationary mode of the transportation vehicle by an accelerometer, a time the transportation vehicle has been in the stationary mode, or a location of the transportation vehicle; or
   determine idling rules from the database according to at least one of: the type of vehicle, the type of vehicle plate, the location, or a time.

59. The system according to claim 56, wherein the computing system is configured to:
   store, in the database, at least one route traveled by a vehicle at least a predetermined number of times;
   determine, based on the traffic related data, at least one potential traffic violation within a geographic region on the at least one route; and
   send a respective notification to a display apparatus of the one or more remote computing device prior to the one or more remote computing device entering the geographic region.

60. The system according to claim 56, wherein the computing system is configured to:
   receive at least one user customizable parameter from the one or more remote computing devices;
   identify a matching route based on a start location, an end location, and the at least one user customizable parameter; and
   display the matching route on the remote computing device along with information corresponding to the at least one user customizable parameter.

* * * * *